United States Patent
Tsutsui et al.

(10) Patent No.: US 12,516,406 B2
(45) Date of Patent: Jan. 6, 2026

(54) HOT-ROLLED STEEL SHEET

(71) Applicant: NIPPON STEEL CORPORATION, Tokyo (JP)

(72) Inventors: Kazumasa Tsutsui, Tokyo (JP); Hiroshi Shuto, Tokyo (JP); Koutarou Hayashi, Tokyo (JP); Mitsuru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 364 days.

(21) Appl. No.: 18/019,738

(22) PCT Filed: Jun. 15, 2021

(86) PCT No.: PCT/JP2021/022662
§ 371 (c)(1),
(2) Date: Feb. 3, 2023

(87) PCT Pub. No.: WO2022/044492
PCT Pub. Date: Mar. 3, 2022

(65) Prior Publication Data
US 2023/0279532 A1    Sep. 7, 2023

(30) Foreign Application Priority Data

Aug. 27, 2020 (JP) .................................. 2020-143745

(51) Int. Cl.
*C22C 38/58* (2006.01)
*C21D 8/02* (2006.01)
(Continued)

(52) U.S. Cl.
CPC ............ *C22C 38/58* (2013.01); *C21D 8/0205* (2013.01); *C21D 8/0226* (2013.01); *C21D 9/46* (2013.01);
(Continued)

(58) Field of Classification Search
CPC ........ C21D 2211/001; C21D 2211/005; C21D 2211/008; C21D 8/0205; C21D 8/021;
(Continued)

(56) References Cited

U.S. PATENT DOCUMENTS

| 6,544,354 B1 | 4/2003 | Kawano et al. |
| 2015/0376730 A1 | 12/2015 | Shuto et al. |
| 2023/0047602 A1* | 2/2023 | Tsutsui .................. C22C 38/008 |

FOREIGN PATENT DOCUMENTS

| JP | H 11-61326 A | 3/1999 |
| JP | 2005-179703 A | 7/2005 |

(Continued)

OTHER PUBLICATIONS

Dayakar L. Naik et al., "Texture-Based Metallurgical Phase Identification in Structural Steels: A Supervised Machine Learning Approach", Metals 2019, 9, 546, total of 13 pages.

(Continued)

*Primary Examiner* — Keith D. Hendricks
*Assistant Examiner* — Mayela Aldaz
(74) *Attorney, Agent, or Firm* — Birch, Stewart, Kolasch & Birch, LLP

(57) ABSTRACT

This hot-rolled steel sheet has a predetermined chemical composition, in a microstructure, in terms of area %, martensite and tempered martensite are more than 92.0% and 100.0% or less in total, residual austenite is less than 3.0%, and ferrite is less than 5.0%, an E value that indicates periodicity of the microstructure is 11.0 or more, the I value that indicates uniformity of the microstructure is less than 1.020, a standard deviation of a Mn concentration is 0.60 mass % or less, and a tensile strength is 980 MPa or more.

5 Claims, 1 Drawing Sheet

(51) Int. Cl.
*C21D 9/46* (2006.01)
*C22C 38/00* (2006.01)
*C22C 38/02* (2006.01)
*C22C 38/04* (2006.01)
*C22C 38/06* (2006.01)
*C22C 38/08* (2006.01)
*C22C 38/10* (2006.01)
*C22C 38/12* (2006.01)
*C22C 38/14* (2006.01)
*C22C 38/16* (2006.01)
*C22C 38/44* (2006.01)

(52) U.S. Cl.
CPC .......... *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/44* (2013.01); *C21D 2211/001* (2013.01); *C21D 2211/005* (2013.01); *C21D 2211/008* (2013.01)

(58) Field of Classification Search
CPC ...... C21D 8/0226; C21D 8/0263; C21D 9/46; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/38; C22C 38/44; C22C 38/58

See application file for complete search history.

(56) References Cited

FOREIGN PATENT DOCUMENTS

| | | |
|---|---|---|
| JP | 200770661 A | 3/2007 |
| JP | 2012-251200 A | 12/2012 |
| JP | 2015-124410 A | 7/2015 |
| JP | 2015196891 A * | 11/2015 |
| WO | WO2014/188966 A1 | 11/2014 |

OTHER PUBLICATIONS

Johannes Webel et al., "A new analysis approach based on Haralick texture features for the characterization of microstructure on the example of low-alloy steels", Materials Characterization 144 (2018), pp. 584-596.

Karel Zuiderveld, "Contrast Limited Adaptive Histogram Equalization", Chapter VIII.5, Graphics Gems IV. P.S. Heckbert (Eds.), Cambridge, MA, Academic Press, 1994, pp. 474-485.

* cited by examiner

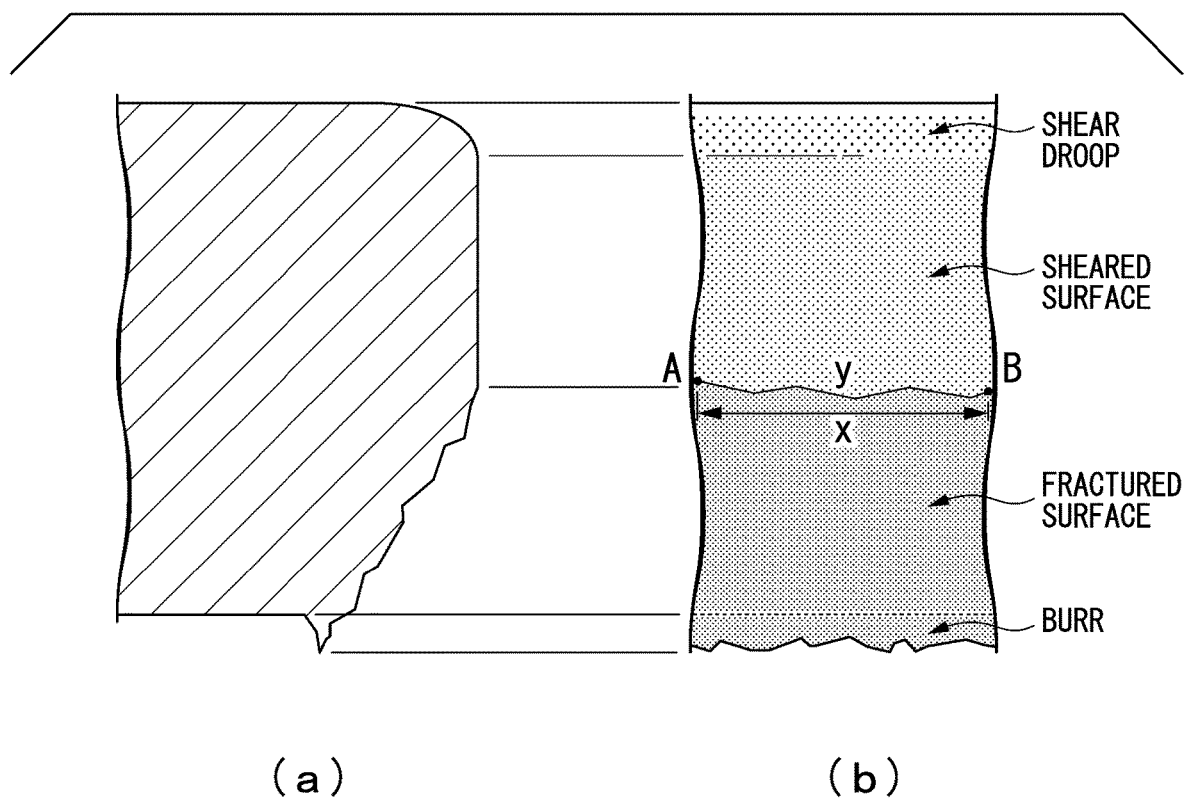

HOT-ROLLED STEEL SHEET

TECHNICAL FIELD OF THE INVENTION

The present invention relates to a hot-rolled steel sheet. Specifically, the present invention relates to a hot-rolled steel sheet that is formed into various shapes by press working or the like to be used, and particularly relates to a hot-rolled steel sheet that has high strength and has excellent hole expansibility and shearing property.

Priority is claimed on Japanese Patent Application No. 2020-143745, filed on Aug. 27, 2020, the content of which is incorporated herein by reference.

BACKGROUND ART

In recent years, from the viewpoint of protecting the global environment, efforts have been made to reduce the amount of carbon dioxide gas emitted in many fields. Vehicle manufacturers are also actively developing techniques for reducing the weight of vehicle bodies for the purpose of reducing fuel consumption. However, it is not easy to reduce the weight of vehicle bodies since the emphasis is placed on improvement in collision resistance to secure the safety of the occupants.

In order to achieve both vehicle body weight reduction and collision resistance, an investigation has been conducted to make a member thin by using a high-strength steel sheet. Therefore, there is a strong demand for a steel sheet having both high strength and excellent formability, and several techniques have been conventionally proposed to meet this demand. Since there are various working methods for vehicle members, the required formability differs depending on members to which the working methods are applied, but among these, hole expansibility is placed as important indices for formability. In addition, vehicle members am formed by press forming, and the press-formed blank sheet is often manufactured by highly productive shearing working.

For example, Patent Document 1 discloses a high-strength steel sheet for a vehicle having excellent collision resistant safety and formability, in which residual austenite having an average crystal grain size of 5 μm or less is dispersed in ferrite having an average crystal grain size of 10 μm or less. In the steel sheet containing residual austenite in the microstructure, while the austenite is transformed into martensite during working and large elongation is exhibited due to transformation-induced plasticity, the formation of full hard martensite impairs hole expansibility. Patent Document 1 discloses that not only ductility but also hole expansibility are improved by refining the ferrite and the residual austenite.

Patent Document 2 discloses a high-strength steel sheet having excellent elongation and hole expansibility and having a tensile strength of 980 MPa or more, in which a second phase consisting of residual austenite and/or martensite is finely dispersed in crystal grains.

Patent Documents 3 and 4 disclose a high-tension hot-rolled steel sheet having excellent ductility and hole expansibility and a method for manufacturing the same. Patent Document 3 discloses a method for manufacturing a high-strength hot-rolled steel sheet having favorable ductility and stretch flangeability, in which a steel sheet is cooled to a temperature range of 720° C. or lower within 1 second after the finishing of hot rolling, caused to stay in a temperature range of higher than 500° C. to 720° C. or lower for a stay time of 1 to 20 seconds, and then coiled in a temperature range of 350° C. to 500°. In addition. Patent Document 4 discloses a high-strength hot-rolled steel sheet having favorable ductility and stretch flangeability, in which mainly bainite and an appropriate amount of polygonal ferrite and residual austenite are contained, and the average grain size of grains that are surrounded by grain boundaries having a crystal orientation difference of 150 or more is 15 μm or less in a steel structure excluding the residual austenite.

PRIOR ART DOCUMENT

Patent Document

[Patent Document 1] Japanese Unexamined Patent Application, First Publication No. H11-61326
[Patent Document 2] Japanese Unexamined Patent Application, First Publication No. 2005-179703
[Patent Document 3] Japanese Unexamined Patent Application, First Publication No. 2012-251200
[Patent Document 4] Japanese Unexamined Patent Application, First Publication No. 2015-124410

Non-Patent Document

[Non-Patent Document 1] J. Webel, J. Gola, D. Britz, F. Mucklich, Materials Characterization 144 (2018) 584-596
[Non-Patent Document 2] D. L. Naik, H. U. Sajid, R. Kiran, Metals 2019, 9,
[Non-Patent Document 3] K. Zuiderveld, Contrast Limited Adaptive Histogram Equalization, Chapter VIII. 5, Graphics Gems IV. P. S. Heckbert (Eds.), Cambridge, MA, Academic Press, 1994, pp. 474-485

DISCLOSURE OF THE INVENTION

Problems to be Solved by the Invention

Since there are various working methods for vehicle members, the required formability differs depending on members to which the working methods are applied, but among these, hole expansibility is placed as important indices for formability. In addition, vehicle components are formed by press forming, but the press-formed blank sheet is often manufactured by highly productive shearing working and needs to be excellent in terms of end surface accuracy after shearing working. Particularly for a high-strength steel sheet of 980 MPa or more, the load required for a post treatment such as coining after shearing working is large, and thus it is desired to control the unevenness of a fractured surface on an end surface after shearing working with particularly high accuracy.

The techniques disclosed in Patent Documents 1 to 4 are all techniques for improving strength and press formability during hole expansion, but no techniques for improving shearing property are mentioned, and a post treatment becomes necessary in a stage of press-forming a component, which makes the production cost presumed to increase.

The present invention has been made in view of the above problems of the related art, and an object of the present invention is to provide a hot-rolled steel sheet having high strength and excellent hole expansibility and shearing property.

Means for Solving the Problem

In view of the above problems, the present inventors obtained the following findings (a) to (f) as a result of intensive studies on the chemical composition of the hot-rolled steel sheet and a relationship between a microstructure and mechanical properties, and completed the present invention.

In addition, having excellent shearing property indicates that the linearity of the boundary between a fractured surface and a sheared surface on an end surface after shearing working is high. This is because, when the linearity of the boundary between a fractured surface and a sheared surface on an end surface after shearing working is high, the end surface accuracy after shearing working can be regarded as excellent. In addition, the expression of having excellent strength or having high strength indicates that the tensile strength is 980 MPa or more.

(a) In order to obtain excellent tensile (maximum) strength and hole expansibility, a primary phase structure of the microstructure is preferably full hard. That is, it is preferable that the fraction of a soft structure such as ferrite or bainite is as small as possible.

(b) In order to form a large amount of martensite and tempered martensite, it is effective to rapidly cool the austenite structure to a predetermined temperature. Therefore, it is effective to cool a steel sheet to a predetermined temperature without performing intermediate air cooling during a hot rolling process.

(c) In order to increase the linearity of the boundary between a fractured surface and a sheared surface on an end surface after shearing working, it is important that Mn segregation does not occur much, the microstructural morphology is not periodic, but random, and the microstructure is made to be non-uniform (poorly uniform).

(d) Specifically, it is effective to control the standard deviation of the Mn concentration to a certain value or less and to control the periodicity of the microstructure and the uniformity of the microstructure for increasing the linearity of the boundary between a fractured surface and a sheared surface on an end surface after shearing working.

(e) In order to control the standard deviation of the Mn concentration to a certain value or less, a slab heating step and a subsequent hot rolling step are important. For example, it is effective that the steel sheet is held in a temperature range of 700° C. to 850° C. for 900 seconds or longer, further heated, and held in a temperature range of 1100° C. or higher for 6000 seconds or longer and that hot rolling is performed such that a total of 90% or more of the sheet thickness reduces in a temperature range of 850° C. to 1100° C.

(f) In order to reduce the periodicity of the microstructural morphology, it is important to control the recrystallization behavior of austenite during hot rolling. For example, it is effective to control the rolling reduction and rolling temperature of the final stage of hot rolling to within a predetermined range, set stress that is loaded to the steel sheet after rolling one stage before the final stage of hot rolling and before the final stage rolling to 170 kPa or more, and set stress that is loaded to the steel sheet after the final stage of hot rolling and until the steel sheet is cooled to 800° C. to less than 200 kPa. Such hot rolling conditions make it possible to produce fine and equiaxed recrystallized austenite grains and make it possible to reduce the periodicity of the microstructural morphology in combination with conditions for subsequent cooling.

The gist of the present invention made based on the above findings is as follows.

(1) A hot-rolled steel sheet according to an aspect of the present invention includes, in terms of mass %, as a chemical composition:

C: 0.040% to 0.250%,
Si: 0.05% to 3.00%,
Mn: 1.00% to 4.00%,
sol. Al: 0.001% to 0.500%,
P: 0.100% or less,
S: 0.0300% or less,
N: 0.1000% or less,
O: 0.0100% or less,
Ti: 0% to 0.300%,
Nb: 0% to 0.300%,
V: 0% to 0.500%,
Cu: 0% to 2.00%,
Cr: 0% to 2.00%,
Mo: 0% to 1.00%,
Ni: 0% to 2.00%,
B: 0% to 0.0100%,
Ca: 0% to 0.0200%,
Mg: 0% to 0.0200%,
REM: 0% to 0.1000%.
Bi: 0% to 0.020%,
one or two or more of Zr, Co, Zn, and W: 0% to 1.00% in total,
Sn: 0% to 0.05%, and
a remainder consisting of Fe and impurities,
in which, in a microstructure,
in terms of area %,
martensite and tempered martensite are more than 92.0% and 100.0% or less in total,
residual austenite is less than 3.0%, and
ferrite is less than 5.0%,
an E value that indicates periodicity of the microstructure is 11.0 or more, and an I value that indicates uniformity of the microstructure is less than 1.020,
a standard deviation of a Mn concentration is 0.60 mass % or less, and
a tensile strength is 980 MPa or more.

(2) The hot-rolled steel sheet according to (1), in which an average crystal grain size of a surface layer may be less than 3.0 μm.

(3) The hot-rolled steel sheet according to (1) or (2) may further contain, in terms of mass %, one or two or more selected from the group consisting of, as the chemical composition T: 0.005% to 0.300%,
Nb: 0.005% to 0.100%,
V: 0.005% to 0.500%,
Cu: 0.01% to 2.00%.
Cr: 0.01% to 2.00%,
Mo: 0.01% to 1.00%,
Ni: 0.02% to 2.00%,
B: 0.0001% to 0.0100%,
Ca: 0.0005% to 0.0200%,
Mg: 0.0005% to 0.0200%,
REM: 0.0005% to 0.1000%, and
Bi: 0.0005% to 0.020%.

Effects of the Invention

According to the above aspect according to the present invention, it is possible to obtain a hot-rolled steel sheet having excellent strength, hole expansibility, and shearing property. In addition, according to the preferable aspect according to the present invention, it is possible to obtain a hot-rolled steel sheet which has the above various properties and, furthermore, suppresses the occurrence of inside bend cracking, that is, has excellent inside bend cracking resistance.

The hot-rolled steel sheet according to the above aspect of the present invention is suitable as an industrial material used for vehicle members, mechanical structural members, and building members.

BRIEF DESCRIPTION OF THE DRAWINGS

FIG. 1 is a view for describing a method of measuring the linearity of a boundary between a fractured surface and a sheared surface on an end surface after shearing working.

EMBODIMENTS OF THE INVENTION

The chemical composition and microstructure of a hot-rolled steel sheet according to the present embodiment will be more specifically described below. However, the present invention is not limited only to a configuration disclosed in the present embodiment, and various modifications can be made without departing from the scope of the gist of the present invention.

The numerical limit range described below with "to" in between includes the lower limit and the upper limit. Regarding the numerical value indicated by "less than" or "more than", the value does not fall within the numerical range. In the following description, % regarding the chemical composition of the steel sheet is mass % unless particularly otherwise specified.

1. Chemical Composition

The hot-rolled steel sheet according to the present embodiment includes, in terms of mass %, C: 0.040% to 0.250%, Si: 0.05% to 3.00%, Mn: 1.00% to 4.00%, sol. Al: 0.001% to 0.500%, P: 0.100% or less, S: 0.0300% or less, N: 0.1000% or less, O: 0.0100% or less, and a remainder consisting of Fe and impurities. Each element will be described in detail below.

(1-1) C: 0.040% to 0.250%

C increases the area fraction of a hard phase. In addition, C increases the strength of martensite by bonding to a precipitation hardening element such as Ti, Nb, or V. When the C content is less than 0.040%, it is difficult to obtain a desired strength. In addition, when the C content is less than 0.040%, the ferrite fraction increases, and the I value also increases due to an influence of a flat ferrite structure. Therefore, the C content is set to 0.040% or more. The C content is preferably 0.060% or more and more preferably 0.070% or more. On the other hand, when the C content is more than 0.250%, the formation of low-strength pearlite is promoted, and the area fractions of martensite and tempered martensite decrease, which decreases the strength of the hot-rolled steel sheet. In addition, when the C content is more than 0.250%, a flat cementite structure increases, and the E value decreases due to an influence of the formation of a carbide region with a small brightness difference. Therefore, the C content is set to 0.250% or less. The C content is preferably 0.150% or less.

(1-2) Si: 0.05% to 3.00%

Si has an action of delaying the precipitation of cementite. This action makes it possible to increase the area fractions of martensite and tempered martensite and makes it possible to increase the strength of the steel sheet by solid solution strengthening. In addition, Si has an action of making steel sound by deoxidation (suppressing the occurrence of a defect such as a blowhole in steel). When the Si content is less than 0.05%, an effect by the action cannot be obtained. In addition, when the Si content is less than 0.05%, the flat cementite structure increases, and the I value also increases due to the influence of the formation of a carbide region with a small brightness difference. Therefore, the Si content is set to 0.05% or more. The Si content is preferably 0.50% or more or 1.00% or more. However, when the Si content is more than 3.00%, the surface properties, chemical convertibility, furthermore, hole expansibility, and weldability of the steel sheet significantly deteriorate, and the $A_3$ transformation point significantly increases. Therefore, it becomes difficult to perform hot rolling in a stable manner. In addition, when the Si content is more than 3.00%, the ferrite fraction increases, and the E value decreases due to the influence of the flat ferrite structure. Therefore, the Si content is set to 3.00% or less. The Si content is preferably 2.70% or less and more preferably 2.50% or less.

(1-3) Mn: 1.00% to 4.00%

Mn has an action of suppressing ferritic transformation to increase the strength of the steel sheet. When the Mn content is less than 1.00%, a tensile strength of 980 MPa or more cannot be obtained. Therefore, the Mn content is set to 1.00% or more. The Mn content is preferably 1.50% or more, 2.00% or more, or 2.30% or more. On the other hand, when the Mn content is more than 4.00%, due to the segregation of Mn, the crystal orientation differences of the crystal grains in the hard phase become non-uniform, and the linearity of the boundary between a fractured surface and a sheared surface on the end surface after shearing working deteriorates. Therefore, the Mn content is set to 4.00% or less. The Mn content is preferably 3.70% or less or 3.50% or less.

(1-4) Sol. Al: 0.001% to 0.500%

Similar to Si, Al has an action of making the steel sheet sound by deoxidizing steel and has an action of increasing the area fractions of martensite and tempered martensite by suppressing the precipitation of cementite from austenite. When the sol. Al content is less than 0.001%, an effect by the action cannot be obtained. Therefore, the sol. Al content is set to 0.001% or more. The sol. Al content is preferably 0.010% or more. On the other hand, when the sol. Al content is more than 0.500%, the above effects are saturated, which is not economically preferable, and thus the sol. Al content is set to 0.500% or less. The sol. Al content is preferably 0.400% or less or 0.300% or less.

The sol. Al in the present embodiment means acid-soluble Al and refers to solid solution Al present in steel in a solid solution state.

(1-5) P: 0.100% or Less

P is an element that is generally contained as an impurity and is also an element having an action of increasing the strength by solid solution strengthening. Therefore, P may be positively contained, but P is an element that is easily segregated, and, when the P content exceeds 0.100%, the deterioration of hole expansibility attributed to boundary segregation becomes significant. Therefore, the P content is limited to 0.100% or less. The P content is preferably 0.030% or less. The lower limit of the P content does not need to be particularly specified, but is preferably set to 0.001% from the viewpoint of the refining cost.

(1-6) S: 0.0300% or Less

S is an element that is contained as an impurity and forms a sulfide-based inclusion in steel to degrade the hole expansibility of the hot-rolled steel sheet. When the S content exceeds 0.0300%, the hole expansibility of the steel sheet significantly deteriorates. Therefore, the S content is limited to 0.0300% or less. The S content is preferably 0.0050% or less. The lower limit of the S content does not need to be particularly specified, but is preferably set to 0.0001% from the viewpoint of the refining cost.

(1-7) N: 0.1000% or Less

N is an element that is contained in steel as an impurity and has an action of degrading the hole expansibility of the steel sheet. When the N content is more than 0.1000%, the hole expansibility of the steel sheet significantly deteriorates. Therefore, the N content is set to 0.1000% or less. The N content is preferably 0.0800% or less and more preferably 0.0700% or less. The lower limit of the N content does not need to be specified and may be 0.0001%. As described below, in a case where one or two or more of Ti, Nb, and V are contained to refine the microstructure, the N content is preferably set to 0.0010% or more and more preferably set to 0.0020% or more to promote the precipitation of a carbonitride.

(1-8) O: 0.0100% or Less

When a large amount of O is contained in steel, O forms a coarse oxide that becomes the starting point of fracture and causes brittle fracture and hydrogen-induced cracks. Therefore, the O content is limited to 0.0100% or less. The O content is preferably 0.0080% or less or 0.0050% or less. The O content may be set to 0.0005% or more or 0.0010% or more to disperse a large number of fine oxides when molten steel is deoxidized.

The remainder of the chemical composition of the hot-rolled steel sheet according to the present embodiment may consist of Fe and an impurity. In the present embodiment, the impurities mean substances that are incorporated from ore as a raw material, a scrap, a manufacturing environment, or the like and are permitted to an extent that the hot-rolled steel sheet according to the present embodiment is not adversely affected.

In addition to the above elements, the hot-rolled steel sheet according to the present embodiment may contain Ti, Nb, V, Cu, Cr, Mo, Ni, B, Ca, Mg, REM, Bi, Zr, Co, Zn, W, and Sn as optional elements. In a case where the above optional elements are not contained, the lower limit of the content thereof is 0%. Hereinafter, the above optional elements will be described in detail.

(1-9) Ti: 0.005% to 0.300%, Nb: 0.005% to 0.100%, and V: 0.005% to 0.500%

Since all of Ti, Nb, and V are precipitated as a carbide or a nitride in steel and have an action of refining the microstructure by an austenite pinning effect, one or two or more of these elements may be contained. In order to more reliably obtain the effect by the action, it is preferable that the Ti content is set to 0.005% or more, the Nb content is set to 0.005% or more, or the V content is set to 0.005% or more. That is, the content of even one of Ti, Nb, and V is preferably set to 0.005% or more. However, even when these elements are excessively contained, the effect by the action is saturated, which is not economically preferable. Therefore, the Ti content is set to 0.300% or less, the Nb content is set to 0.100% or less, and the V content is set to 0.500% or less.

(1-10) Cu: 0.01% to 2.00%, Cr: 0.01% to 2.00%, Mo: 0.01% to 1.00%, Ni: 0.02% to 2.00%, and B: 0.0001% to 0.0100%

All of Cu, Cr, Mo, Ni, and B have an action of enhancing the hardenability of the hot-rolled steel sheet. In addition, Cu and Mo have an action of precipitating a carbide at low temperatures in steel to increase the strength. Furthermore, in a case where Cu is contained, Ni has an action of effectively suppressing the grain boundary cracking of a slab caused by Cu. Therefore, one or two or more of these elements may be contained.

As described above, Cu has an action of enhancing the hardenability of the hot-rolled steel sheet and an action of being precipitated as a carbide in steel at a low temperature to increase the strength of the steel sheet. In order to more reliably obtain the effect by the action, the Cu content is preferably set to 0.01% or more and more preferably set to 0.05% or more. However, when the Cu content is more than 2.00%, grain boundary cracking may occur in the slab in some cases. Therefore, the Cu content is set to 2.00% or less. The Cu content is preferably 1.50% or less or 1.00% or less.

As described above, Cr has an action of enhancing the hardenability of the hot-rolled steel sheet and an action of precipitating a carbide in steel at a low temperature to increase the strength. In order to more reliably obtain the effect by the action, the Cr content is preferably set to 0.01% or more or 0.05% or more. However, when the Cr content is more than 2.00%, the chemical convertibility of the steel sheet significantly deteriorates. Therefore, the Cr content is set to 2.00% or less.

As described above, Mo has an action of enhancing the hardenability of the hot-rolled steel sheet and an action of precipitating a carbide in steel to increase the strength. In order to more reliably obtain the effect by the action, the Mo content is preferably set to 0.01% or more or 0.02% or more. However, even when the Mo content is set to more than 1.00%, the effect by the action is saturated, which is not economically preferable. Therefore, the Mo content is set to 1.00% or less. The Mo content is preferably 0.50% or less and 0.20% or less.

As described above, Ni has an action of enhancing the hardenability of the hot-rolled steel sheet. In addition, in a case where Cu is contained, Ni has an action of effectively suppressing the grain boundary cracking of the slab caused by Cu. In order to more reliably obtain the effect by the action, the Ni content is preferably set to 0.02% or more. Since Ni is an expensive element, it is not economically preferable to contain a large amount of Ni. Therefore, the Ni content is set to 2.00% or less.

As described above, B has an action of enhancing the hardenability of the hot-rolled steel sheet. In order to more reliably obtain the effect by the action, the B content is preferably set to 0.0001% or more or 0.0002% or more. However, when the B content is more than 0.0100%, the hole expansibility of the steel sheet significantly deteriorates, and thus the B content is set to 0.0100% or less. The B content is preferably 0.0050% or less.

(1-11) Ca: 0.0005% to 0.0200%, Mg: 0.0005% to 0.0200%, REM: 0.0005% to 0.1000%, and Bi: 0.0005% to 0.020%

All of Ca, Mg, and REM have an action of enhancing the hole expansibility of the hot-rolled steel sheet by adjusting the shape of inclusions to a preferable shape. In addition, Bi has an action of enhancing the formability of the hot-rolled steel sheet by refining the solidification structure. Therefore, one or two or more of these elements may be contained. In order to more reliably obtain the effect by the action, it is preferable that any one or more of Ca, Mg, REM, and Bi are set to 0.0005% or more. However, when the Ca content or the Mg content exceeds 0.0200% or when the REM content exceeds 0.1000%, an inclusion is excessively formed in steel, and thus the hole expansibility of the steel sheet may be conversely degraded in some cases. In addition, even when the Bi content is set to more than 0.020%, the above effect by the action is saturated, which is not economically preferable. Therefore, the Ca content and the Mg content are set to 0.0200% or less, the REM content is set to 0.1000% or less, and the Bi content is set to 0.020% or less. The Bi content is preferably 0.010% or less.

Here, REM refers to a total of 17 elements consisting of Sc, Y, and lanthanoids, and the REM content refers to the total amount of these elements. In the case of the lanthanoids, the lanthanoids are industrially added in the form of misch metal.

(1-12) One or Two or More of Zr, Co, Zn, or W: 0% to 1.00% in Total and Sn: 0% to 0.05%

Regarding Zr, Co, Zn, and W, the present inventors have confirmed that, even when a total of 1.00% or less of these elements are contained, the effect of the hot-rolled steel sheet according to the present embodiment is not impaired. Therefore, one or two or more of Zr, Co, Zn, or W may be contained in a total of 1.00% or less.

In addition, the present inventors have confirmed that, even when a small amount of Sn is contained, the effect of the hot-rolled steel sheet according to the present embodiment is not impaired. However, a defect may be generated during hot rolling, and thus the Sn content is set to 0.05% or less.

The chemical composition of the above hot-rolled steel sheet may be measured by a general analytical method. For example, inductively coupled plasma-atomic emission spectrometry (ICP-AES) may be used for measurement. sol. Al may be measured by the ICP-AES using a filtrate after a sample is decomposed with an acid by heating. C and S may be measured by using a combustion-infrared absorption method, N may be measured by using the inert gas melting-thermal conductivity method, and O may be measured using an inert gas melting-non-dispersive infrared absorption method.

2. Microstructure of Hot-Rolled Steel Sheet

Next, the microstructure of the hot-rolled steel sheet according to the present embodiment will be described.

In the microstructure of the hot-rolled steel sheet according to the present embodiment, in terms of area %, martensite and tempered martensite are more than 92.0% and 100.0% or less in total, residual austenite is less than 3.0%, and ferrite is less than 5.0%, the E value that indicates the periodicity of the microstructure is 11.0 or more, the I value that indicates the uniformity of the microstructure is less than 1.020, and the standard deviation of the Mn concentration is 0.60 mass % or less. Therefore, the hot-rolled steel sheet according to the present embodiment can obtain excellent strength, hole expansibility, and shearing property. In the present embodiment, the microstructure is specified at a ¼ depth position of the sheet thickness from a surface and a center position in a sheet width direction in a cross section parallel to a rolling direction. The reason therefor is that the microstructure at this position indicates a typical microstructure of the steel sheet.

(2-1) Area Fraction of Residual Austenite: Less than 3.0%

Residual austenite is a microstructure that is present as a face-centered cubic lattice even at room temperature. Residual austenite has an action of enhancing the hole expansibility of the hot-rolled steel sheet by transformation-induced plasticity (TRIP). On the other hand, residual austenite transforms into high-carbon martensite during shearing working, which inhibits the stable occurrence of cracking and causes the deterioration of the linearity of the boundary between a fractured surface and a sheared surface on the end surface after shearing working. When the area fraction of the residual austenite is 3.0% or more, the above action becomes actualized, the shearing property of the hot-rolled steel sheet deteriorates (the linearity of the boundary between a fractured surface and a sheared surface on an end surface after shearing working deteriorates), and the hole expansibility also deteriorates. Therefore, the area fraction of the residual austenite is set to less than 3.0%. The area fraction of the residual austenite is preferably 1.5% or less and more preferably less than 1.0%. Since residual austenite is preferably as little as possible, the area fraction of the residual austenite may be 0%.

(2-2) Area Fraction of Ferrite: Less than 5.0%

Ferrite is generally a soft microstructure. When a predetermined amount or more of ferrite is contained, a desired strength may not be obtained, and the region of a sheared surface on an end surface after shearing working may increase. When the region of the sheared surface on the end surface after shearing working increases, the linearity of the boundary between the sheared surface and the fractured surface on the end surface deteriorates, which is not preferable. When the area fraction of the ferrite is 5.0% or more, the action is actualized, and the shearing property of the hot-rolled steel sheet deteriorates. Therefore, the area fraction of the ferrite is set to less than 5.0%. The area fraction of the ferrite is preferably 3.0% or less, more preferably 2.0% or less, and still more preferably less than 1.0%. Since ferrite is preferably as little as possible, the area fraction of the ferrite may be 0%.

As the measurement method of the area fraction of the residual austenite, methods by X-ray diffraction, electron back scatter diffraction image (EBSP, electron back scattering diffraction pattern) analysis, and magnetic measurement and the like may be used and the measured values may differ depending on the measurement method. In the present embodiment, the area fraction of the residual austenite is measured by X-ray diffraction.

In the measurement of the area fraction of the residual austenite by X-ray diffraction in the present embodiment, first, the integrated intensities of a total of 6 peaks of $\alpha(110)$, $\alpha(200)$, $\alpha(211)$, $\gamma(111)$, $\gamma(200)$, and $\gamma(220)$ are obtained in the cross section parallel to the rolling direction at a ¼ depth position of the sheet thickness (a region between a depth of ⅛ of the sheet thickness from the surface to a depth of ⅜ of the sheet thickness from the surface) and the center position in the sheet width direction of the hot-rolled steel sheet using Co-K$\alpha$ rays, and the area fraction of the residual austenite is obtained by calculation using the strength averaging method.

Measurement of the area fraction of the ferrite is conducted by the following method. A cross section parallel to the rolling direction is mirror-finished and, furthermore, polished at room temperature with colloidal silica not containing an alkaline solution for 8 minutes, thereby removing strain introduced into the surface layer of a sample. In a random position of the sample cross section in a longitudinal direction, a region with a length of 50 μm and between a depth of ⅛ of the sheet thickness from the surface to a depth of ⅜ of the sheet thickness from the surface is measured by electron backscatter diffraction at a measurement interval of 0.1 μm to obtain crystal orientation information. For the measurement, an EBSD analyzer configured of a thermal field emission scanning electron microscope (JSM-7001F manufactured by JEOL) and an EBSD detector (DVC5 type detector manufactured by TSL) is used. At this time, the degree of vacuum inside the EBSD analyzer is set to $9.6\times10$ Pa or less, the acceleration voltage is set to 15 kV, the irradiation current level is set to 13, and the electron beam irradiation level is set to 62.

Next, a reflected electron image is photographed at the same visual field. Crystal grains where ferrite and cementite are precipitated in layers are specified from the reflected electron image, and the area fraction of the crystal grains is calculated, whereby the area fraction of the pearlite can be obtained.

After that, for crystal grains except the crystal grains determined as pearlite, from the obtained crystal orientation information, regions where the grain average misorientation value is 1.0° or less are determined as ferrite using a "Grain Average Misorientation" function installed in software "OIM Analysis (registered trademark)" included in the EBSD analyzer. The area fraction of the region determined as the ferrite is obtained, thereby obtaining the area fraction of the ferrite.

Subsequently, under a condition of defining a 5° grain boundary in the residual region (a region where the grain average misorientation value is more than 1.0°) as a crystal grain boundary, when the maximum value of "Grain Average IQ" of a ferrite region is indicated by Iα, a region with more than Iα/2 is extracted as bainite. The area fraction of the bainite can be obtained by calculating the area ratio of the extracted bainite.

(2-3) Total Area Fraction of Martensite and Tempered Martensite: More than 92.0% and 100.0% or Less When the total area fraction of martensite and tempered martensite is 92.0% or less, a desired strength cannot be obtained. Therefore, the total area fraction of the martensite and the tempered martensite is set to more than 92.0%. The total area fraction is preferably 95.0% or more, 97.0% or more, or 99.0% or more. The total area fraction of the martensite and the tempered martensite is preferably as large as possible and thus may be set to 100.0%.

A method for measuring the area fraction of the martensite and the tempered martensite will be described below.

First, in order to observe the same region as the EBSD measurement region in which the area fraction of the ferrite has been measured with a SEM, a Vickers indentation is stamped in the vicinity of an observation position. After that, the structure of an observed section is left, contamination on the surface layer is removed by polishing, and Nital etching is performed. Next, the same visual field as the EBSD observed section is observed with the SEM at a magnification of 3000 times. In the EBSD measurement, among regions determined as a structure other than ferrite, a region in which a substructure is present within grains and cementite is precipitated in a plurality of variant forms is determined as tempered martensite. A region in which the brightness is high and a substructure is not exposed by etching is determined as "martensite or residual austenite". The area fraction of each is calculated, thereby obtaining the area fraction of the tempered martensite and the area fraction of "martensite and residual austenite". The area fraction of martensite is obtained by subtracting the area fraction of the residual austenite obtained by the above X-ray diffraction from the obtained area fraction of "martensite and residual austenite". The total of the area fraction of the martensite and the area fraction of the tempered martensite is calculated, thereby obtaining the total of the area fractions of the martensite and the tempered martensite.

Regarding the removal of contaminant on the surface layer of the observed section, a method such as buffing using alumina particles having a particle size of 0.1 μm or less Ar ion sputtering may be used.

In the hot-rolled steel sheet according to the present embodiment, as the remainder in microstructure, one or two of bainite and pearlite may be contained in a total area fraction of 0% or more and less than 8.0%.

(2-4) E Value: 11.0 or More, I Value: Less than 1.020

In order to enhance the linearity of the boundary between a fractured surface and a sheared surface on the end surface after shearing working, it is important to reduce the periodicity of the microstructure and reduce the uniformity of the microstructure. In the present embodiment, the linearity of the boundary between a fractured surface and a sheared surface on the end surface after shearing working is enhanced by controlling the E (Entropy) value that indicates the periodicity of the microstructure and the I (inverse differenced moment norm) value that indicates the uniformity of the microstructure.

The E value represents the periodicity of the microstructure. In a case where the brightness is periodically arranged due to an influence of the formation of a band-like structure or the like, that is, the periodicity of the microstructure is high, the E value decreases. In the present embodiment, since there is a need to make the microstructure poorly periodic, it is necessary to increase the E value. When the E value is less than 11.0, the linearity of the boundary between a fractured surface and a sheared surface on an end surface after shearing working is likely to deteriorate. In a microstructure where the periodicity is high, that is, the E value is low, cracking occurs from periodically arranged structures as starting points along a plurality of band-like structures present in the vicinities of the starting points to form a fractured surface. This is presumed to make the linearity of the boundary between a fractured surface and a sheared surface on an end surface after shearing working likely to deteriorate. Therefore, the E value is set to 11.0 or more. The E value is preferably 11.1 or more and more preferably 11.2 or more. The E value is preferably as high as possible, and the upper limit is not particularly specified and may be set to 13.5 or less, 13.0 or less, 12.5 or less, or 12.0 or less.

The I value represents the uniformity of the microstructure and increases as the area of a region having certain brightness increases. A high I value means that the uniformity of the microstructure is high. In the present embodiment, it is necessary to provide a microstructure mainly composed of martensite with low uniformity of brightness, and thus there is a need to reduce the I value. When the uniformity of the microstructure is high, that is, the I value is high, cracking is likely to occur from the tip of a shearing tool due to an influence of hardness difference attributed to precipitates in crystal grains, an element concentration difference, and soft ferrite. As a result, the linearity of the boundary between a fractured surface and a sheared surface on an end surface after shearing working is likely to deteriorate. That is, when the I value is 1.020 or more, it is presumed that the linearity of the boundary between a fractured surface and a sheared surface on an end surface after shearing working cannot be enhanced. Therefore, the I value is set to less than 1.020. The I value is preferably 1.015 or less and more preferably 1.010 or less. The lower limit of the I value is not particularly specified and may be 0.900 or more, 0.950 or more, or 1.000 or more.

The E value and the I value can be obtained by the following method.

In the present embodiment, the photographing region of a SEM image photographed for calculating the E value and the I value is a ¼ depth position of the sheet thickness from the surface of the steel sheet (a region between a depth of ⅛ of the sheet thickness from the surface and a depth of ⅜ of the sheet thickness from the surface) and the center position in the sheet width direction in a cross section parallel to the rolling direction. The SEM image is photographed using an SU-6600 Schottky electron gun manufactured by Hitachi High-Technologies Corporation with a tungsten emitter and an acceleration voltage of 1.5 kV. Based on the above settings, the SEM image is output at a magnification of 1000 times and a gray scale of 256 gradations.

Next, on an image obtained by cutting out the obtained SEM image into a 880×880-pixel region, a smoothing treatment described in Non-Patent Document 3, in which the contrast-enhanced limit magnification is set to 2.0 and the tile grid size is 8×8 is performed. The smoothed SEM image is rotated counterclockwise from 0 degrees to 179 degrees in increments of 1 degree, excluding 90 degrees, and an image is created at each angle, thereby obtaining a total of 179 images. Next, from each of these 179 images, the frequency values of brightness between adjacent pixels are sampled in a matrix form using the GLCM method described in Non-Patent Document 1.

179 matrixes of the frequency values sampled by the above method are expressed as $p_k$ (k=0 . . . 89, 91, . . . 179) where k is a rotation angle from the original image. $p_k$'s generated for individual images are summed for all k's (k=0 . . . 89, 91, . . . 179), and then 256×256 matrixes P standardized such that the total of individual components becomes 1 are calculated. Furthermore, the E value and the I value are each calculated using the following formula (1) and formula (2) described in Non-Patent Document 2. In the following formula (1) and formula (2), the value at the $i^{th}$ row in the $j^{th}$ column of the matrix P is expressed as $P_{ij}$.

$$E = -\Sigma_{i=1,j=1}^{i=256,j=256} P_{ij} \log P_{ij} \quad (1)$$

$$I = \Sigma_{i=1,j=1}^{i=256,j=256} P_{ij}/(i+|i-j|/256) \quad (2)$$

(2-5) Standard Deviation of Mn Concentration: 0.60 Mass % or Less

The standard deviation of the Mn concentration at the ¼ depth position of the sheet thickness from the surface of the hot-rolled steel sheet according to the present embodiment and the center position in the sheet width direction is 0.60 mass % or less. This makes it possible to uniformly disperse the hard phase and makes it possible to prevent deterioration of the linearity of the boundary between a fractured surface and a sheared surface on an end surface. That is, the shearing property can be improved. The standard deviation of the Mn concentration is preferably 0.50 mass % or less and more preferably 0.47 mass % or less. The value of the lower limit of the standard deviation of the Mn concentration is desirably as small as possible from the viewpoint of suppressing excessively large burrs, but the substantial lower limit is 0.10 mass % due to restrictions in the manufacturing process.

After a cross section parallel to the rolling direction of the hot-rolled steel sheet (L cross section) is mirror polished, and then a ¼ depth position of the sheet thickness from the surface of the steel sheet (a region between a depth of ⅛ of the sheet thickness from the surface and a depth of ⅜ of the sheet thickness from the surface) and the center position in the sheet width direction is measured with an electron probe microanalyzer (EPMA) to measure the standard deviation of the Mn concentration. As the measurement conditions, the acceleration voltage is set to 15 kV, the magnification is set to 5000 times, and the distribution image of a range that is 20 μm long in the sample rolling direction and 20 μm long in the sample sheet thickness direction is measured. More specifically, the measurement interval is set to 0.1 μm, and the Mn concentrations at 40000 or more points are measured. Next, the standard deviation is calculated based on the Mn concentrations obtained from all of the measurement points, thereby obtaining the standard deviation of the Mn concentration.

(2-6) Average Crystal Grain Size of Surface Layer: Less than 3.0 μm

When the crystal grain size of the surface layer is fine, it is possible to suppress inside bend cracking in the hot-rolled steel sheet. As the strength of the steel sheet increases, it is more likely that cracking occurs from the inside bend during bending (hereinafter, referred to as inside bend cracking). The mechanism of inside bend cracking is presumed as follows. At the time of bending, compressive stress is generated in the inside bend. In the beginning, the working proceeds while the entire inside bend is uniformly distorted; however, as the amount of the working increases, distortion cannot proceed only with uniform distortion, and distortion proceeds with strain locally concentrating (generation of a shear deformation band). As this shear deformation band further grows, cracks are initiated along the shear band from the surface of the inside bend and propagate. It is presumed that the reason for the inside bend cracking to be more likely to occur in association with high-strengthening is that deterioration of work hardening capability in association with high-strengthening makes it difficult for uniform distortion to proceed and makes it easy for bias of distortion to be caused, which generates a shear deformation band at an early stage of the working (or under loose working conditions).

The present inventors found from studies that inside bend cracking becomes significant in steel sheets having a tensile strength of 980 MPa or more. In addition, the present inventors found that, as the crystal grain size of the surface layer of the hot-rolled steel sheet becomes finer, local strain concentration is further suppressed, and it becomes more unlikely that inside bend cracking occurs. In order to obtain the above action, the average crystal grain size of the surface layer of the hot-rolled steel sheet is preferably set to less than 3.0 μm. The average crystal grain size is more preferably set to 2.5 μm or less.

In the present embodiment, the surface layer is a region from the surface of the hot-rolled steel sheet to a depth position of 50 μm from the surface.

The crystal grain size of the surface layer is measured using the EBSP-OIM method. In a region from the surface of the hot-rolled steel sheet to a depth position of 50 μm from the surface and at the center position in the sheet width direction in a cross section parallel to the rolling direction, at least 5 visual fields are analyzed at a magnification of 1200 times in a 40 μm×30 μm region, and a place where the angle difference between adjacent measurement points is 5° or more is defined as a crystal grain boundary, and an area-averaged crystal grain size is calculated. The obtained area-averaged crystal grain size is regarded as the average crystal grain size of the surface layer.

Since residual austenite is not a structure formed by phase transformation at 600° C. or lower and does not have an effect of dislocation accumulation, in the present measurement method, residual austenite is not regarded as an analysis target. In the EBSP-OIM method, residual austenite having an fcc crystal structure can be excluded from the analysis target.

3. Tensile Strength Properties

In the hot-rolled steel sheet according to the present embodiment, the tensile (maximum) strength is 980 MPa or more. When the tensile strength is less than 980 MPa, an applicable component is limited, and the contribution to vehicle body weight reduction is small. The upper limit does not need to be particularly limited and may be set to 1780 MPa from the viewpoint of suppressing the wearing of a die.

The tensile strength is measured according to JIS Z 2241: 2011 using a No. 5 test piece of JIS Z 2241: 2011. The sampling position of the tensile test piece may be a ¼ portion from the end portion in the sheet width direction, and a direction perpendicular to the rolling direction may be the longitudinal direction.

4. Hole-Expanding Properties

In the hot-rolled steel sheet according to the present embodiment, the hole expansion rate λ is preferably 55% or more. When the hole expansion rate λ is 55% or more, it is possible to obtain a hot-rolled steel sheet that greatly contributes to vehicle body weight reduction without limiting applicable components. There is no need to specifically limit the upper limit.

The hole expansion rate λ is measured according to JIS Z 2256: 2010 using a No. 5 test piece of JIS Z 2241: 2011. The sampling position of the hole expansion test piece may be a ¼ portion from the end portion of the hot-rolled steel sheet in the sheet width direction.

5. Sheet Thickness

The sheet thickness of the hot-rolled steel sheet according to the present embodiment is not particularly limited and may be 0.5 to 8.0 mm. When the sheet thickness of the hot-rolled steel sheet is set to 0.5 mm or more, it becomes easy to secure the rolling finishing temperature, the rolling force can be reduced, and thus it is possible to easily perform hot rolling. Therefore, the sheet thickness of the hot-rolled steel sheet according to the present embodiment may be set to 0.5 mm or more. The sheet thickness is preferably 1.2 mm or more and 1.4 mm or more. In addition, when the sheet thickness is set to 8.0 mm or less, the refinement of the microstructure becomes easy, and the above-described microstructure can be easily secured. Therefore, the sheet thickness may be set to 8.0 mm or less. The sheet thickness is preferably 6.0 mm or less.

6. Others (6-1) Plating Layer

The hot-rolled steel sheet according to the present embodiment having the above-described chemical composition and microstructure may be provided with a plating layer on the surface for the purpose of improving corrosion resistance and the like and thereby made into a surface-treated steel sheet. The plating layer may be an electro plating layer or a hot-dip plating layer. Examples of the electro plating layer include electrogalvanizing, electro Zn—Ni alloy plating, and the like. Examples of the hot-dip plating layer include hot-dip galvanizing, hot-dip galvannealing, hot-dip aluminum plating, hot-dip Zn—Al alloy plating, hot-dip Zn—Al—Mg alloy plating, hot-dip Zn—Al—Mg—Si alloy plating, and the like. The plating adhesion amount is not particularly limited and may be the same as before. In addition, it is also possible to further enhance the corrosion resistance by performing an appropriate chemical conversion treatment (for example, the application and drying of a silicate-based chromium-free chemical conversion treatment liquid) after plating.

7. Manufacturing Conditions

A suitable method for manufacturing the hot-rolled steel sheet according to the present embodiment having the above-described chemical composition and microstructure is as follows.

In order to obtain the hot-rolled steel sheet according to the present embodiment, it is important to perform hot rolling after heating a slab under predetermined conditions, perform accelerated cooling to a predetermined temperature range, and control the cooling history after coiling.

In the suitable method for manufacturing the hot-rolled steel sheet according to the present embodiment, the following steps (1) to (8) are sequentially performed. The temperature of the slab and the temperature of the steel sheet in the present embodiment refer to the surface temperature of the slab and the surface temperature of the steel sheet.

(1) The slab is held in a temperature range of 700° C. to 850° C. for 900 seconds or longer, then, further heated, and held in a temperature range of 1100° C. or higher for 6000 seconds or longer.

(2) Hot rolling is performed in a temperature range of 850° C. to 1100° C. so that the sheet thickness is reduced by a total of 90% or more.

(3) Stress of 170 kPa or more is loaded to the steel sheet after rolling one stage before the final stage of the hot rolling and before the final stage rolling.

(4) The rolling reduction at the final stage of the hot rolling is set to 8% or more, and the hot rolling is finished so that the rolling finishing temperature Tf becomes 900° C. or higher and lower than 960° C.

(5) Stress that is loaded to the steel sheet after the final stage rolling of the hot rolling and until the steel sheet is cooled to 800° C. is set to less than 200 kPa.

(6) The steel sheet is cooled to a temperature range of the hot rolling finishing temperature Tf−50° C. or lower within 1 second after the finishing of the hot rolling, and then accelerated cooling is performed to a temperature T1 (° C.) represented by the following formula <1> at an average cooling rate of 50° C./sec or faster. Here, the cooling to the temperature range of the hot rolling finishing temperature Tf−50° C. or lower within 1 second after the finishing of the hot rolling is a more preferable cooling condition.

(7) Cooling is performed from T1 (° C.) to the coiling temperature at an average cooling rate of 50° C./sec or faster.

(8) The coiling temperature is set to 350° C. or lower.

$$T1(°\text{C.}) = 770 - 270 \times [C] - 90 \times [Mn] - 37 \times [Ni] - 70 \times [Cr] - 83 \times [Mo] \quad <1>$$

However, the [element symbol] in each formula indicates the content (mass %) of each element in the steel. When the element is not contained, substitution is performed with 0.

A hot-rolled steel sheet having a microstructure with excellent strength, hole expansibility, and shearing property can be stably manufactured by adopting the above manufacturing method. That is, when the slab heating conditions and the hot rolling conditions are appropriately controlled, the reduction of Mn segregation and equiaxed austenite before transformation are achieved, and, in cooperation with the cooling conditions after the hot rolling to be described below, a hot-rolled steel sheet having a desired microstructure can be stably manufactured.

(7-1) Slab, Slab Temperature and Holding Time on Hot Rolling

As the slab that is subjected to hot rolling, a slab obtained by continuous casting, a slab obtained by casting and blooming, or the like can be used, and, if necessary, it is possible to use the above slabs after hot working or cold working. The slab that is subjected to hot rolling is preferably held in a temperature range of 700° C. to 850° C. for 900 seconds or longer during heating, then, further heated, and held in a temperature range of 1100° C. or higher for 6000 seconds or longer. During holding in the temperature range of 700° C. to 850° C., the steel sheet temperature may be fluctuated or be maintained constant in this temperature range. Furthermore, during holding in the temperature range of 1100° C. or higher, the steel sheet temperature may be fluctuated or be maintained constant in a temperature range of 1100° C. or higher.

In austenite transformation at 700° C. to 850° C., Mn is distributed between ferrite and austenite, and Mn can be diffused into the ferrite region by extending the transformation time. Accordingly, the Mn microsegregation unevenly distributed in the slab can be eliminated, and the standard deviation of the Mn concentration can be significantly reduced. Reduction in the standard deviation of the Mn concentration makes it possible to enhance the linearity between a fractured surface and a sheared surface on an end surface after shearing working.

In addition, in order to reduce the standard deviation of the Mn concentration, the holding time in the temperature range of 1100° C. or higher is preferably set to 6000 seconds or longer. In order to obtain a desired amount of martensite and tempered martensite, the temperature held for 6000 seconds or longer is preferably set to 1100° C. or higher.

In the hot rolling, it is preferable to use a reverse mill or a tandem mill for multi-pass rolling. Particularly, from the viewpoint of industrial productivity, it is more preferable that at least the final several stages are subjected to hot rolling using a tandem mill.

(7-2) Rolling Reduction of Hot Rolling: Sheet Thickness Reduction of Total of 90% or More in Temperature Range of 850° C. To 1100° C.

When the hot rolling is performed so that the sheet thickness is reduced by a total of 90% or more in a temperature range of 850° C. to 1100° C., mainly recrystallized austenite grains are refined, accumulation of strain energy into the unrecrystallized austenite grains is promoted, the recrystallization of austenite is promoted, and the atomic diffusion of Mn is promoted, which makes it possible to reduce the standard deviation of the Mn concentration. Therefore, the hot rolling is performed so that the sheet thickness is reduced by a total of 90% or more in the temperature range of 850° C. to 1100° C.

The sheet thickness reduction in a temperature range of 850° C. to 1100° C. can be expressed as $(t_0-t_1)/t_0 \times 100(\%)$ when an inlet sheet thickness before the first pass in the rolling in this temperature range is $t_0$ and an outlet sheet thickness after the final pass in the rolling in this temperature range is $t_1$.

(7-3) Stress after Rolling One Stage Before Final Stage of Hot Rolling and Before Final Stage Rolling: 170 KPa or More The stress that is loaded to the steel sheet after rolling one stage before the final stage of hot rolling and before the final stage rolling is preferably set to 170 kPa or more. This makes it possible to reduce the number of crystal grains having a {110}<001> crystal orientation in the recrystallized austenite after the rolling one stage before the final stage. Since {110}<001> is a crystal orientation that is difficult to recrystallize, recrystallization by the final stage rolling can be effectively promoted by suppressing the formation of this crystal orientation. As a result, the band-like structure of the hot-rolled steel sheet is improved, the periodicity of the microstructure is reduced, and the E value increases. In a case where the stress that is loaded to the steel sheet is less than 170 kPa, it may be impossible to achieve an E value of 11.0 or more. The stress that is loaded to the steel sheet is more preferably 190 kPa or more. The stress that is loaded to the steel sheet can be controlled by adjusting the roll rotation speed during tandem rolling.

(7-4) Rolling Reduction at Final Stage of Hot Rolling: 8% or more, Hot Rolling Finishing Temperature Tf: 900° C. or higher and lower than 960° C.

It is preferable that the rolling reduction at the final stage of the hot rolling is set to 8% or more and the hot rolling finishing temperature Tf is set to 900° C. or higher. When the rolling reduction at the final stage of the hot rolling is set to 8% or more, it is possible to promote recrystallization caused by the final stage rolling. As a result, the band-like structure of the hot-rolled steel sheet is improved, the periodicity of the microstructure is reduced, and the E value increases. When the hot rolling finishing temperature Tf is set to 900° C. or higher, it is possible to suppress an excessive increase in the number of ferrite nucleation sites in austenite. As a result, the formation of ferrite in the final structure (the microstructure of the hot-rolled steel sheet after manufacturing) is suppressed, and a high-strength hot-rolled steel sheet can be obtained. In addition, when Tf is set to lower than 960° C., it is possible to suppress the coarsening of the austenite grain sizes and to set the E value to 11.0 or more by reducing the periodicity of the microstructure.

(7-5) Stress after Final Stage Rolling of Hot Rolling and Until Steel Sheet being Cooled to 800° C.: Less than 200 KPa Stress that is loaded to the steel sheet after the final stage rolling of the hot rolling and until the steel sheet is cooled to 800° C. is preferably set to less than 200 kPa. When the stress that is loaded to the steel sheet is set to less than 200 kPa, the recrystallization of austenite preferentially proceeds in the rolling direction, and an increase in the periodicity of the microstructure can be suppressed. As a result, the E value can be set to 11.0 or more. The stress that is loaded to the steel sheet is more preferably 180 MPa or less.

(7-6) Steel Sheet being Cooled to Temperature Range of Hot Rolling Finishing Temperature Tf−50° C. or Lower, then, Cooled to T1 (° C.) at Average Cooling Rate of 50° C./Sec or Faster After the finishing of the hot rolling, the steel sheet is cooled to a temperature range of the hot rolling finishing temperature Tf−50° C. or lower, and then accelerated cooling is performed to T1 (° C.) or lower at an average cooling rate of 50° C./sec or faster, which makes it possible to suppress the formation of ferrite, bainite, and pearlite. Accordingly, the strength of the hot-rolled steel sheet improves. The average cooling rate referred to herein is a value obtained by dividing the temperature drop width of the steel sheet from the start of accelerated cooling (when introducing the steel sheet into cooling equipment) to T1 (° C.) by the time required from the start of accelerated cooling to when the steel sheet temperature reaches T1 (° C.). When the average cooling rate to T1 (° C.) is set to 50° C./sec or faster after the steel sheet is cooled to the temperature range of the hot rolling finishing temperature Tf−50° C. or lower, it is possible to suppress ferritic transformation, bainitic transformation, and/or pearlitic transformation in the steel sheet and to obtain TS≥980 MPa. When air cooling or the like is performed during the accelerated cooling to T1 (° C.) after the finishing of the hot rolling, it becomes impossible to realize an average cooling rate of 50° C./sec or faster, and the above effect cannot be obtained.

The upper limit of the average cooling rate is not particularly specified, but when the cooling rate is increased, the cooling equipment becomes large and the equipment cost increases. Therefore, considering the equipment cost, the average cooling rate of the accelerated cooling is preferably 300° C./sec or slower.

In the cooling after the finishing of the hot rolling, the steel sheet is more preferably cooled to the temperature range of the hot rolling finishing temperature Tf−50° C. within 1.0 second after the finishing of the hot rolling. That is, it is more preferable to set the cooling amount for 1 second after the finishing of the hot rolling to 50° C. or more. This is because it is possible to suppress the growth of austenite crystal grains refined by the hot rolling. In order to cool the steel sheet to a temperature range of the hot rolling finishing temperature Tf−50° C. or lower within 1.0 second after the finishing of the hot rolling, it is preferable to perform cooling with a fast average cooling rate, for example, spraying of cooling water to the surface of the steel sheet, immediately after the finishing of the hot rolling. When the steel sheet is cooled to the temperature range of Tf−50° C. or lower within 1.0 second after the finishing of the hot rolling, it is possible to refine the crystal grain size of the surface layer and to enhance the inside bend cracking resistance of the hot-rolled steel sheet.

After the steel sheet is cooled to the temperature range of the hot rolling finishing temperature Tf−50° C. or within 1.0 second after the finishing of the hot rolling, as described above, it is preferable to perform accelerated cooling such that the average cooling rate to T1 (° C.) or lower is set to 50° C./sec or faster.

(7-7) Average Cooling Rate from T1 (° C.) to Coiling Temperature being 50° C./Sec or Faster In order to suppress the area fraction of ferrite, bainite, and pearlite and to obtain a strength of TS≥980 MPa, it is preferable to set the average cooling rate from T1 (° C.) to the coiling temperature to 50° C./sec or faster. In such a case, the primary phase structure can be made full hard. The average cooling rate referred to herein refers to a value obtained by dividing the temperature drop width of the steel sheet from T1 (° C.) to the coiling temperature by the time required from when the steel sheet temperature reaches T1 (° C.) to coiling. When the average cooling rate is set to 50° C./sec or faster, it is possible to suppress the area fraction of ferrite, bainite, and pearlite and to secure strength and shearing property. Therefore, the average cooling rate from T1 (° C.) to the coiling temperature is set to 50° C./sec or faster.

(7-8) Coiling Temperature: 350° C. or Lower

The coiling temperature is preferably set to 350° C. or lower. When the coiling temperature is set to 350° C. or lower, it is possible to increase the transformation driving force from austenite to bcc and it is also possible to increase the deformation strength of austenite. Therefore, when austenite transforms into martensite, the hard phase is uniformly distributed, and variation can be improved. As a result, it is possible to reduce the I value and to enhance the linearity of the boundary between a fractured surface and a sheared surface on an end surface after shearing working. That is, excellent shearing property can be obtained. In addition, it is possible to suppress the deterioration of the hole expansibility attributed to the influence of residual austenite. Therefore, the coiling temperature is preferably set to 350° C. or lower.

EXAMPLES

Next, the effects of one aspect of the present invention will be described more specifically by way of examples, but the conditions in the examples are condition examples adopted for confirming the feasibility and effects of the present invention. The present invention is not limited to these condition examples. The present invention can adopt various conditions as long as the object of the present invention is achieved without departing from the gist of the present invention.

Steels having a chemical composition shown in Tables 1 and 2 were melted and continuously cast to manufacture slabs having a thickness of 240 to 300 mm. The obtained slabs were used to obtain hot-rolled steel sheets shown in Table 5A to Table 6B under the manufacturing conditions shown in Table 3A to Table 4B. In addition, in Manufacturing No. 11 in Table 3A, a hot-rolled steel sheet was manufactured by holding a steel sheet in a temperature range of 700° C. to 850° C., then, further heating the steel sheet, and holding the steel sheet at 1036° C. for 9366 seconds.

The area fraction of the microstructure, the E value, the I value, the standard deviation of the Mn concentration, and the average crystal grain size of the surface layer of each the obtained hot-rolled steel sheets were obtained by the above methods. The obtained measurement results are shown in Table 5A to Table 6B.

The remainder in microstructure was one or two of bainite and pearlite.

Evaluation Method of Properties of Hot-Rolled Steel Sheets (1) Tensile Strength and Hole Expansion Rate The tensile strength was evaluated according to JIS Z 2241: 2011. A test piece was a No. 5 test piece of JIS Z 2241: 2011. The sampling position of the tensile test piece was a ¼ portion from the end portion in the sheet width direction, and a direction perpendicular to the rolling direction was regarded as the longitudinal direction.

The hole expansion rate A was measured according to JIS Z 2256: 2010 using a No. 5 test piece of JIS Z 2241: 2011. The sampling position of the hole expansion test piece was a ¼ portion from the end portion of the hot-rolled steel sheet in the sheet width direction.

In a case where the tensile strength satisfied TS≥980 MPa, the hot-rolled steel sheet was considered to be excellent in terms of strength and judged to be acceptable. On the other hand, in a case where the tensile strength was TS<980 MPa, the hot-rolled steel sheet was considered to be poor in strength and judged to be unacceptable.

In a case where the hole expansion rate was ≥55%, the hot-rolled steel sheet was considered to be excellent in terms of hole expansibility and judged to be acceptable. On the other hand, in a case where the hole expansion rate was <55%, the hot-rolled steel sheet was considered to be poor in hole expansibility and judged to be unacceptable.

(2) Shearing Property

The shearing property of the hot-rolled steel sheet was evaluated by obtaining the straightness at the boundary between a fractured surface and a sheared surface by a punching test. At the sheet width center position, five punched holes were produced with a hole diameter of 10 mm, a clearance of 15%, and a punching speed of 3 m/s. Next, the appearances of 10 end surfaces parallel to the rolling direction (2 end surfaces per 1 punched hole) were photographed with an optical microscope in the 5 punched holes. In the obtained observation photographs, end surfaces as shown in FIG. 1(a) could be observed. As shown in FIGS. 1(a) and 1(b), a shear droop, a sheared surface, a fractured surface, and a burr are observed on the end surface after punching. FIG. 1(a) is a schematic view of the end surface parallel to the rolling direction of the punched hole, and FIG. 1(b) is a schematic view of the side surface of the punched hole. The shear droop is an R-like smooth surface, the sheared surface is a punched end surface separated by shear deformation, the fractured surface is a punched end surface separated by a crack initiated from the vicinity of the cutting edge after the end of shear deformation, and a burr is a surface having projections protruding from the lower surface of the hot-rolled steel sheet.

In the observation photographs of the 10 end surfaces obtained from the 5 end surfaces, the straightness at the boundary between the fractured surface and the sheared surface was measured by a method to be described below, and the absolute maximum value of the obtained straightness was calculated. In a case where the absolute maximum value of the obtained straightness was less than 1.045, the linearity of the boundary between a fractured surface and a sheared surface on an end surface after shearing working was high, that is, the hot-rolled steel sheet was considered to be excellent in terms of shearing property and judged to be acceptable. On the other hand, in a case where the absolute maximum value of the obtained straightness was 1.045 or more, the linearity of the boundary between a fractured surface and a sheared surface on an end surface after shearing working was low, that is, the hot-rolled steel sheet was considered to be poor in shearing property and judged to be unacceptable.

The straightness at the boundary between the fractured surface and the sheared surface was obtained by the following method.

As shown in FIG. 1(b), points (point A and point B in FIG. 1(b)) in the boundary between the sheared surface and the fractured surface were determined with respect to the end surface. The length of the distance x between these points A and B connected with a straight line was measured. Next, the length y of the curve along the fractured surface-sheared surface boundary was measured. A value obtained by dividing the obtained y by x was regarded as the straightness at the boundary between the fractured surface and the sheared surface.

(3) Inside Bend Cracking Resistance

As a bending test piece, a 100 mm×30 mm strip-shaped test piece was cut out from a ½ position in the width direction of the hot-rolled steel sheet, and the inside bend cracking resistance was evaluated by the following bending test.

For both a bend where the bending ridge was parallel to the rolling direction (L direction) (L-axis bending) and a bend where the bending ridge was parallel to a direction perpendicular to the rolling direction (C direction) (C-axis bending), the inside bend cracking resistance was investigated according to JIS Z 2248: 2014 (V block 90° bending test), the minimum bend radii at which cracks were not initiated were obtained, and a value obtained by dividing the average value of the minimum bend radii in the L axis and in the C axis by the sheet thickness was regarded as the limit bend R/t and used as an index value of bendability. In a case where R/t≤3.0, the hot-rolled steel sheet was determined to be excellent in terms of inside bend cracking resistance.

Here, regarding the presence or absence of cracks, a cross section obtained by cutting the test piece after the V block 90° bending test on a surface parallel to the bending direction and perpendicular to the sheet surface was mirror polished, then, cracks were observed with an optical microscope, and a case where the lengths of cracks observed in the inside bend of the test piece exceeded 30 μm was determined as cracks being present.

The obtained measurement results are shown in Table 6A and Table 6B.

TABLE 1

| Steel | Mass %, remainder is Fe and impurities | | | | | | | | | | | |
|---|---|---|---|---|---|---|---|---|---|---|---|---|
| No. | C | Si | Mn | sol. Al | P | S | N | O | Ti | Nb | V | Note |
| A | 0.048 | 1.16 | 1.69 | 0.033 | 0.021 | 0.0012 | 0.0039 | 0.0051 | | | | Present Invention Example |
| B | 0.073 | 0.99 | 2.16 | 0.031 | 0.011 | 0.0035 | 0.0037 | 0.0054 | | | | Present Invention Example |
| C | 0.068 | 1.28 | 1.75 | 0.067 | 0.015 | 0.0043 | 0.0013 | 0.0014 | | | | Present Invention Example |
| D | 0.073 | 0.38 | 1.81 | 0.038 | 0.022 | 0.0046 | 0.0052 | 0.0000 | | | | Present Invention Example |
| E | 0.065 | 2.76 | 1.86 | 0.037 | 0.029 | 0.0021 | 0.0004 | 0.0016 | | | | Present Invention Example |
| F | 0.056 | 0.97 | 1.23 | 0.053 | 0.010 | 0.0062 | 0.0036 | 0.0004 | 0.105 | | | Present Invention Example |
| G | 0.071 | 1.21 | 3.88 | 0.030 | 0.031 | 0.0035 | 0.0029 | 0.0057 | | 0.045 | | Present Invention Example |
| H | 0.063 | 0.79 | 1.90 | 0.042 | 0.025 | 0.0021 | 0.0031 | 0.0032 | | | | Present Invention Example |
| I | 0.078 | 1.11 | 1.74 | 0.038 | 0.013 | 0.0094 | 0.0016 | 0.0034 | | | 0.144 | Present Invention Example |
| J | 0.062 | 1.09 | 1.72 | 0.030 | 0.016 | 0.0044 | 0.0039 | 0.0060 | 0.039 | 0.026 | 0.068 | Present Invention Example |
| K | 0.071 | 0.83 | 1.72 | 0.044 | 0.017 | 0.0018 | 0.0046 | 0.0019 | | | | Present Invention Example |

TABLE 1-continued

| Steel No. | Mass %, remainder is Fe and impurities | | | | | | | | | | | Note |
|---|---|---|---|---|---|---|---|---|---|---|---|---|
| | C | Si | Mn | sol. Al | P | S | N | O | Ti | Nb | V | |
| L | 0.072 | 0.83 | 1.80 | 0.052 | 0.029 | 0.0004 | 0.0019 | 0.0004. | | | | Present Invention Example |
| M | 0.075 | 1.12 | 1.65 | 0.043 | 0.025 | 0.0034 | 0.0011 | 0.0057 | | | 0.055 | Present Invention Example |
| N | 0.057 | 1.09 | 1.46 | 0.043 | 0.018 | 0.0041 | 0.0039 | 0.0037 | 0.099 | | | Present Invention Example |
| O | 0.074 | 1.07 | 1.70 | 0.050 | 0.012 | 0.0002 | 0.0023 | 0.0031 | | 0.089 | | Present Invention Example |
| P | 0.036 | 0.97 | 2.01 | 0.027 | 0.007 | 0.0056 | 0.0063 | 0.0039 | 0.126 | | | Comparative Example |
| Q | 0.259 | 0.88 | 1.78 | 0.058 | 0.011 | 0.0034 | 0.0045 | 0.0071 | | | | Comparative Example |
| R | 0.043 | 3.22 | 1.70 | 0.029 | 0.020 | 0.0052 | 0.0032 | 0.0036 | | | | Comparative Example |
| S | 0.046 | 0.02 | 1.81 | 0,063 | 0.016 | 0.0038 | 0.0092 | 0.0014 | | | | Comparative Example |
| T | 0.051 | 1.08 | 4.10 | 0.041 | 0.014 | 0.0029 | 0.0039 | 0.0058 | 0.041 | 0.013 | | Comparative Example |
| U | 0.071 | 1.14 | 2.11 | 0.321 | 0.013 | 0.0044 | 0.0022 | 0.0017 | | | | Present Invention Example |
| V | 0.066 | 0.88 | 3.38 | 0.035 | 0.019 | 0.0057 | 0.0049 | 0.0060 | | | | Present Invention Example |

Underlines indicate that corresponding values are outside the range of the present invention.

TABLE 2

| Steel No. | Mass %, remainder is Fe and impurities | | | | | | | | | | | | | | T1 | Note |
|---|---|---|---|---|---|---|---|---|---|---|---|---|---|---|---|---|
| | Cu | Cr | Mo | Ni | B | Ca | Mg | REM | Bi | Zr | Co | Zn | W | Sn | | |
| A | | | | | | 0.0018 | 0.0014 | | | | | | | | 605 | Present Invention Example |
| B | | | | | | | | | | | | | | | 556 | Present Invention Example |
| C | | | | | | | | 0.0032 | | | | | | | 594 | Present Invention Example |
| D | | 0.28 | 0.18 | 0.37 | | | | | | | | | | | 539 | Present Invention Example |
| E | | | | | | | | | 0.004 | | | | 0.15 | | 585 | Present Invention Example |
| F | | | | | | | | | | | | | | | 644 | Present Invention Example |
| G | | | | | | | | | | | | | | | 402 | Present Invention Example |
| H | | | | | | | | | | 0.02 | | | | | 582 | Present Invention Example |
| I | | | | | | | | | | | | | | | 592 | Present Invention Example |
| J | | | | | | | | | | | | | | | 599 | Present Invention Example |
| K | 0.13 | | | | | | | | | | 0.16 | | | | 596 | Present Invention Example |

TABLE 2-continued

| Steel No. | Cu | Cr | Mo | Ni | B | Ca | Mg | REM | Bi | Zr | Co | Zn | W | Sn | T1 | Note |
|---|---|---|---|---|---|---|---|---|---|---|---|---|---|---|---|---|
| L | | 0.24 | | | | | | | | | | | | | 572 | Present Invention Example |
| M | | | 0.15 | | | | | | | | | | | 0.02 | 589 | Present Invention Example |
| N | | | | 0.22 | | | | | | | | | | | 615 | Present Invention Example |
| O | | | | | 0.0026 | | | | | | | 0.02 | | | 597 | Present Invention Example |
| P | | | | | | | | | | | | | | | 580 | Comparative Example |
| Q | | | | | | | | | | | | | | | 540 | Comparative Example |
| R | | | | | | | | | | | | | | | 606 | Comparative Example |
| S | | | | | | | | | | | | | | | 595 | Comparative Example |
| T | | | | | | | | | | | | | | | 387 | Comparative Example |
| U | | | | | | | | | | | | | | | 561 | Present Invention Example |
| V | | | | | | | | | | | | | | | 448 | Present Invention Example |

TABLE 3A

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage before final stage rolling kPa | Hot rolling finishing temperature Tf ° C. | Rolling reduction of final stage % | Stress loaded after final stage rolling of hot rolling until steel sheet being cooled to 800° C. kPa | Note |
|---|---|---|---|---|---|---|---|---|---|---|
| 1 | A | 1162 | 1249 | 9303 | 92 | 205 | 920 | 10 | 175 | Present Invention Example |
| 2 | B | 1268 | 1250 | 9372 | 94 | 229 | 951 | 9 | 173 | Present Invention Example |
| 3 | B | 752 | 1252 | 9408 | 96 | 216 | 944 | 8 | 179 | Comparative Example |
| 4 | B | 1486 | 1238 | 9188 | 88 | 211 | 923 | 10 | 194 | Comparative Example |
| 5 | B | 1332 | 1217 | 4389 | 93 | 233 | 951 | 9 | 191 | Comparative Example |
| 6 | B | 1265 | 1229 | 9021 | 96 | 150 | 952 | 9 | 195 | Comparative Example |
| 7 | B | 1272 | 1225 | 9178 | 95 | 207 | 1037 | 8 | 173 | Comparative Example |
| 8 | B | 1314 | 1211 | 8766 | 95 | 191 | 924 | 5 | 184 | Comparative Example |
| 9 | B | 1570 | 1248 | 9416 | 95 | 227 | 931 | 8 | 261 | Comparative Example |
| 10 | B | 1501 | 1243 | 9498 | 94 | 212 | 943 | 11 | 170 | Present Invention Example |

TABLE 3A-continued

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage before final stage rolling kPa | Hot rolling finishing temperature Tf ° C. | Rolling reduction of final stage % | Stress loaded after final stage rolling of hot rolling until steel sheet being cooled to 800° C. kPa | Note |
|---|---|---|---|---|---|---|---|---|---|---|
| 11 | B | 1254 | <u>1036</u> | 9366 | 96 | 200 | 940 | 11 | 189 | Comparative Example |
| 12 | B | 1379 | 1234 | 8951 | 95 | 225 | 930 | 11 | 177 | Comparative Example |
| 13 | B | 1491 | 1230 | 9428 | 93 | 215 | 929 | 9 | 178 | Comparative Example |
| 14 | B | 1255 | 1227 | 9069 | 94 | 210 | 926 | 8 | 177 | Comparative Example |
| 15 | C | 1137 | 1222 | 9421 | 95 | 232 | 924 | 11 | 184 | Present Invention Example |
| 16 | D | 1399 | 1226 | 9027 | 93 | 218 | 947 | 11 | 177 | Present Invention Example |
| 17 | E | 1257 | 1248 | 8890 | 95 | 216 | 901 | 11 | 190 | Present Invention Example |
| 18 | E | 1443 | 1230 | 9049 | 95 | 199 | 910 | 11 | 190 | Comparative Example |
| 19 | F | 1457 | 1219 | 9267 | 93 | 203 | 944 | 10 | 193 | Present Invention Example |
| 20 | G | 1394 | 1244 | 9090 | 93 | 196 | 956 | 8 | 182 | Present Invention Example |
| 21 | H | 1213 | 1253 | 9130 | 95 | 174 | 957 | 8 | 186 | Present Invention Example |
| 22 | I | 1140 | 1238 | 9052 | 93 | 214 | 927 | 11 | 189 | Present Invention Example |
| 23 | J | 1251 | 1216 | 9102 | 95 | 218 | 955 | 8 | 194 | Present Invention Example |

Underlines indicate that manufacturing conditions are not preferable.

TABLE 3B

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage before final stage rolling kPa | Hot rolling finishing temperature Tf ° C. | Rolling reduction of final stage % | Stress loaded after final stage rolling of hot rolling until steel sheet being cooled to 800° C. kPa | Note |
|---|---|---|---|---|---|---|---|---|---|---|
| 24 | K | 1368 | 1262 | 9075 | 94 | 218 | 932 | 9 | 185 | Present Invention Example |
| 25 | L | 1552 | 1261 | 9145 | 96 | 233 | 934 | 9 | 187 | Present Invention Example |

TABLE 3B-continued

| Manufacturing No. | Steel No. | Holding time in temperature range of 700° C. to 850° C. s | Heating temperature ° C. | Holding time in temperature range of 1100° C. or higher s | Sheet thickness reduction in 850° C. to 1100° C. % | Stress loaded after rolling one stage before final stage before final stage rolling kPa | Hot rolling finishing temperature Tf ° C. | Rolling reduction of final stage % | Stress loaded after final stage rolling of hot rolling until steel sheet being cooled to 800° C. kPa | Note |
|---|---|---|---|---|---|---|---|---|---|---|
| 26 | M | 1520 | 1221 | 9014 | 94 | 223 | 910 | 9 | 179 | Present Invention Example |
| 27 | N | 1547 | 1237 | 9070 | 95 | 225 | 947 | 9 | 193 | Present Invention Example |
| 28 | O | 1277 | 1252 | 8991 | 96 | 208 | 927 | 11 | 185 | Present Invention Example |
| 29 | P | 1526 | 1257 | 9414 | 94 | 212 | 915 | 8 | 186 | Comparative Example |
| 30 | Q | 1274 | 1264 | 9359 | 95 | 206 | 936 | 10 | 177 | Comparative Example |
| 31 | R | 1174 | 1259 | 9143 | 93 | 229 | 920 | 8 | 187 | Comparative Example |
| 32 | S | 1314 | 1247 | 9542 | 96 | 240 | 936 | 10 | 172 | Comparative Example |
| 33 | T | 1177 | 1255 | 9049 | 95 | 211 | 920 | 11 | 174 | Comparative Example |
| 34 | U | 1210 | 1187 | 8695 | 94 | 228 | 911 | 9 | 192 | Present Invention Example |
| 35 | V | 1367 | 1235 | 9310 | 93 | 214 | 932 | 10 | 188 | Present Invention Example |
| 36 | B | 830 | 1241 | 8332 | 93 | 219 | 938 | 10 | 196 | Comparative Example |
| 37 | B | 1200 | 1237 | 5608 | 93 | 208 | 944 | 8 | 195 | Comparative Example |
| 38 | B | 1221 | 1232 | 8237 | 94 | 161 | 954 | 9 | 178 | Comparative Example |
| 39 | B | 1222 | 1224 | 8108 | 93 | 203 | 958 | 6 | 182 | Comparative Example |
| 40 | B | 1334 | 1226 | 8154 | 95 | 198 | 957 | 9 | 210 | Comparative Example |
| 41 | B | 1351 | 1231 | 9176 | 94 | 201 | 959 | 9 | 186 | Comparative Example |
| 42 | B | 1382 | 1195 | 8276 | 93 | 207 | 934 | 8 | 187 | Present Invention Example |
| 43 | R | 1403 | 1198 | 9199 | 92 | 211 | 957 | 9 | 188 | Comparative Example |
| 44 | B | 921 | 1229 | 6120 | 94 | 218 | 930 | 9 | 171 | Present Invention Example |
| 45 | B | 1338 | 1233 | 9332 | 95 | 215 | 931 | 8 | 186 | Present Invention Example |

Underlines indicate that manufacturing conditions are not preferable.

TABLE 4A

| Manufacturing No. | Steel No. | Cooling amount for 1 second after finishing of hot rolling | Average cooling rate in hot rolling finishing temperature Tf-50° C. to T1 ° C/s. | T1 ° C. | Air cooling start temperature ° C. | Air cooling time s | Average cooling rate from T1 to coiling temperature ° C./s | Coiling temperature ° C. | Note |
|---|---|---|---|---|---|---|---|---|---|
| 1 | A | 72 | 101 | 605 | | 0 | 110 | 32 | Present Invention Example |
| 2 | B | 73 | 120 | 556 | | 0 | 134 | 40 | Present Invention Example |
| 3 | B | 70 | 111 | 556 | | 0 | 130 | 38 | Comparative Example |
| 4 | B | 60 | 97 | 556 | | 0 | 147 | 32 | Comparative Example |
| 5 | B | 63 | 114 | 556 | | 0 | 92 | 36 | Comparative Example |
| 6 | B | 74 | 111 | 556 | | 0 | 103 | 29 | Comparative Example |
| 7 | B | 66 | 120 | 556 | | 0 | 102 | 41 | Comparative Example |
| 8 | B | 57 | 62 | 556 | | 0 | 82 | 50 | Comparative Example |
| 9 | B | 78 | 125 | 556 | | 0 | 100 | 30 | Comparative Example |
| 10 | B | 42 | 104 | 556 | | 0 | 94 | 36 | Present Invention Example |
| 11 | B | 62 | 82 | 556 | | 0 | 142 | 42 | Comparative Example |
| 12 | B | 65 | <u>36</u> | 556 | | 0 | 121 | 46 | Comparative Example |
| 13 | B | 79 | <u>31</u> | 556 | 639 | 3.0 | 156 | 35 | Comparative Example |
| 14 | B | 79 | 116 | 556 | | 0 | <u>25</u> | 27 | Comparative Example |
| 15 | C | 34 | 92 | 594 | | 0 | 130 | 30 | Present. Invention Example |
| 16 | D | 62 | 91 | 539 | | 0 | 146 | 43 | Present Invention Example |
| 17 | E | 70 | 93 | 585 | | 0 | 102 | 60 | Present Invention Example |
| 18 | E | 62 | 108 | 585 | | 0 | 56 | <u>370</u> | Comparative Example |
| 19 | F | 59 | 100 | 644 | | 0 | 135 | 80 | Present Invention Example |
| 20 | G | 68 | 88 | 402 | | 0 | 99 | 29 | Present Invention Example |
| 21 | H | 73 | 116 | 582 | | 0 | 124 | 34 | Present Invention Example |
| 22 | I | 75 | 120 | 592 | | 0 | 126 | 62 | Present Invention Example |
| 23 | J | 62 | 104 | 599 | | 0 | 95 | 40 | Present Invention Example |

Underlines indicate that manufacturing conditions are not preferable.

TABLE 4B

| Manufacturing No. | Steel No. | Cooling amount for 1 second after finishing of hot rolling ° C. | Average cooling rate in hot rolling finishing temperature Tf-50° C. to T1 ° C./s | T1 ° C. | Air cooling start temperature ° C. | Air cooling time s | Average cooling rate from T1 to coiling temperature ° C./s | Coiling temperature ° C. | Note |
|---|---|---|---|---|---|---|---|---|---|
| 24 | K | 61 | 128 | 596 | | 0 | 137 | 33 | Present Invention Example |
| 25 | L | 35 | 112 | 572 | | 0 | 152 | 48 | Present Invention Example |
| 26 | M | 65 | 102 | 589 | | 0 | 83 | 37 | Present Invention Example |
| 27 | N | 69 | 102 | 615 | | 0 | 128 | 29 | Present Invention. Example |
| 28 | O | 71 | 117 | 597 | | 0 | 84 | 37 | Present Invention Example |
| 29 | P | 76 | 125 | 580 | | 0 | 91 | 31 | Comparative Example |
| 30 | Q | 80 | 115 | 540 | | 0 | 82 | 28 | Comparative Example |
| 31 | R | 67 | 113 | 606 | | 0 | 133 | 31 | Comparative Example |
| 32 | S | 59 | 109 | 595 | | 0 | 152 | 43 | Comparative Example |
| 33 | T | 73 | 107 | 387 | | 0 | 111 | 48 | Comparative Example |
| 34 | U | 82 | 108 | 561 | | 0 | 132 | 52 | Present Invention Example |
| 35 | V | 57 | 117 | 448 | | 0 | 98 | 45 | Present Invention Example |
| 36 | B | 69 | 104 | 556 | | 0 | 130 | 36 | Comparative Example |
| 37 | B | 68 | 99 | 556 | | 0 | 123 | 36 | Comparative Example |
| 38 | B | 68 | 82 | 556 | | 0 | 121 | 35 | Comparative Example |
| 39 | B | 67 | 111 | 556 | | 0 | 115 | 35 | Comparative Example |
| 40 | B | 64 | 101 | 556 | | 0 | 105 | 38 | Comparative Example |
| 41 | B | 55 | 45 | 556 | | 0 | 96 | 37 | Comparative Example |
| 42 | B | 58 | 109 | 556 | | 0 | 104 | 210 | Present Invention Example |
| 43 | R | 61 | 111 | 606 | | 0 | 108 | 360 | Comparative Example |
| 44 | B | 65 | 76 | 556 | | 0 | 123 | 36 | Present Invention Example |
| 45 | B | 63 | 74 | 556 | | 0 | 53 | 42 | Present Invention Example |

Underlines indicate that manufacturing conditions are not preferable.

TABLE 5A

| Manufacturing No. | Steel No. | Sheet thickness mm | Ferrite Area % | Residual austenite Area % | Martensite and tempered martensite Area % | Remainder in microstructure Area % | E value — | I value | Mn standard deviation Mass % | Average crystal grain size of surface layer μm | Note |
|---|---|---|---|---|---|---|---|---|---|---|---|
| 1 | A | 2.6 | 3.3 | 0.0 | 95.3 | 1.4 | 12.1 | 1.015 | 0.48 | 2.7 | Present Invention Example |
| 2 | B | 2.6 | 1.0 | 0.0 | 98.2 | 0.8 | 13.1 | 1.013 | 0.42 | 2.6 | Present Invention Example |
| <u>3</u> | B | 2.6 | 3.2 | 0.0 | 95.0 | 1.8 | 11.0 | 1.008 | <u>0.62</u> | 2.0 | Comparative Example |
| <u>4</u> | B | 2.6 | 4.0 | 0.0 | 93.5 | 2.5 | 11.8 | 1.008 | <u>0.63</u> | 2.4 | Comparative Example |
| <u>5</u> | B | 2.6 | 2.1 | 0.0 | 93.0 | 4.9 | 12.0 | 1.015 | <u>0.70</u> | 2.2 | Comparative Example |
| <u>6</u> | B | 2.6 | <u>7.2</u> | 0.0 | 92.4 | 0.4 | <u>10.7</u> | <u>1.030</u> | 0.46 | 2.0 | Comparative Example |
| <u>7</u> | B | 2.6 | <u>9.8</u> | 0.0 | <u>89.0</u> | 1.2 | <u>10.8</u> | <u>1.048</u> | 0.49 | 2.6 | Comparative Example |
| <u>8</u> | B | 2.6 | <u>8.6</u> | 0.0 | <u>90.5</u> | 0.9 | <u>10.6</u> | <u>1.042</u> | 0.50 | 2.6 | Comparative Example |
| <u>9</u> | B | 2.6 | <u>5.3</u> | 0.0 | 94.0 | 0.7 | <u>10.8</u> | <u>1.028</u> | 0.44 | 2.2 | Comparative Example |
| 10 | B | 2.6 | 4.1 | 0.0 | 94.8 | 1.1 | 11.5 | 1.007 | 0.43 | 3.3 | Present Invention Example |
| <u>11</u> | B | 2.6 | <u>10.1</u> | 0.0 | <u>88.6</u> | 1.3 | 12.1 | 1.015 | 0.48 | 2.5 | Comparative Example |
| <u>12</u> | B | 2.6 | <u>6.4</u> | 0.0 | <u>92.0</u> | 1.6 | 12.9 | 1.019 | 0.50 | 2.3 | Comparative Example |
| <u>13</u> | B | 2.6 | 10.0 | 0.0 | <u>88.8</u> | 1.2 | 11.6 | <u>1.056</u> | 0.41 | 2.6 | Comparative Example |
| <u>14</u> | B | 2.6 | <u>6.9</u> | 0.0 | 92.5 | 0.6 | 11.9 | <u>1.037</u> | 0.47 | 2.3 | Comparative Example |
| 15 | C | 6.0 | 4.8 | 0.0 | 93.7 | 1.5 | 12.9 | 1.001 | 0.49 | 3.2 | Present Invention Example |
| 16 | D | 2.6 | 0.5 | 0.0 | 99.1 | 0.4 | 11.8 | 1.005 | 0.48 | 2.4 | Present Invention Example |
| 17 | E | 2.6 | 4.5 | 1.5 | 92.6 | 1.4 | 11.1 | 1.015 | 0.42 | 2.0 | Present Invention Example |
| <u>18</u> | E | 2.6 | 4.2 | <u>5.1</u> | <u>89.0</u> | 1.7 | 11.2 | <u>1.047</u> | 0.43 | 2.3 | Comparative Example |
| 19 | F | 1.6 | 4.3 | 0.0 | 93.6 | 2.1 | 11.1 | 1.013 | 0.49 | 2.5 | Present Invention Example |
| 20 | G | 2.6 | 3.6 | 0.0 | 96.2 | 0.2 | 11.3 | 1.003 | 0.57 | 2.3 | Present Invention Example |
| 21 | H | 2.6 | 2.2 | 0.0 | 97.2 | 0.6 | 11.8 | 1.001 | 0.43 | 2.2 | Present Invention Example |
| 22 | I | 2.6 | 1.2 | 0.0 | 98.7 | 0.1 | 13.1 | 1.006 | 0.43 | 2.1 | Present Invention Example |
| 23 | J | 2.6 | 2.4 | 0.0 | 97.5 | 0.1 | 11.2 | 1.011 | 0.43 | 2.1 | Present Invention Example |

Underlines indicate that corresponding values are outside the range of the present invention or not preferable properties.

TABLE 5B

| Manufacturing No. | Steel No. | Sheet thickness mm | Ferrite Area % | Residual austenite Area % | Martensite and tempered martensite Area % | Remainder in microstructure Area % | E value — | I value | Mn standard deviation Mass % | Average crystal grain size of surface layer μm | Note |
|---|---|---|---|---|---|---|---|---|---|---|---|
| 24 | K | 2.6 | 2.6 | 0.0 | 96.8 | 0.6 | 11.2 | 1.013 | 0.49 | 2.5 | Present Invention Example |
| 25 | L | 2.6 | 4.2 | 0.0 | 95.1 | 0.7 | 11.9 | 1.010 | 0.51 | 4.0 | Present Invention Example |
| 26 | M | 2.6 | 3.5 | 0.0 | 96.3 | 0.2 | 11.2 | 1.005 | 0.43 | 2.5 | Present Invention Example |
| 27 | N | 2.6 | 4.2 | 0.0 | 95.7 | 0.1 | 11.0 | 1.011 | 0.51 | 1.8 | Present Invention Example |
| 28 | O | 2.6 | 2.9 | 0.0 | 95.5 | 1.6 | 11.3 | 1.011 | 0.46 | 2.2 | Present Invention Example |
| <u>29</u> | <u>P</u> | 2.6 | <u>5.7</u> | 0.0 | 93.1 | 1.2 | 12.5 | <u>1.023</u> | 0.39 | 2.3 | Comparative Example |
| <u>30</u> | <u>Q</u> | 2.6 | <u>6.8</u> | 1.3 | <u>90.4</u> | 1.5 | <u>10.8</u> | 1.010 | 0.43 | 2.0 | Comparative Example |
| <u>31</u> | <u>R</u> | 2.6 | <u>9.2</u> | 2.4 | <u>87.3</u> | 1.1 | <u>10.1</u> | 1.018 | 0.40 | 3.2 | Comparative Example |
| <u>32</u> | <u>S</u> | 2.6 | <u>5.6</u> | 0.0 | <u>90.8</u> | 3.6 | 11.1 | <u>1.033</u> | 0.51 | 2.1 | Comparative Example |
| <u>33</u> | <u>T</u> | 2.6 | 4.1 | 0.0 | 93.1 | 2.8 | 11.0 | 1.012 | <u>0.62</u> | 2.3 | Comparative Example |
| 34 | U | 2.6 | 2.7 | 0.0 | 95.0 | 2.3 | 12.0 | 1.012 | 0.58 | 2.5 | Present Invention Example |
| 35 | V | 2.6 | 3.5 | 0.0 | 94.4 | 2.1 | 11.7 | 1.015 | 0.56 | 2.6 | Present Invention Example |
| <u>36</u> | B | 2.6 | 3.3 | 0.0 | 92.6 | 4.2 | 11.3 | 1.010 | <u>0.71</u> | 2.6 | Comparative Example |
| <u>37</u> | B | 2.6 | 1.3 | 0.0 | 93.7 | 5.0 | 11.2 | 1.006 | <u>0.65</u> | 2.6 | Comparative Example |
| <u>38</u> | B | 2.6 | 1.6 | 0.0 | 92.8 | 5.6 | <u>10.9</u> | 1.003 | 0.47 | 2.6 | Comparative Example |
| <u>39</u> | B | 2,6 | 3.0 | 0.0 | 92.1 | 4.9 | <u>10.8</u> | 1.002 | 0.47 | 2.6 | Comparative Example |
| <u>40</u> | B | 2.6 | 2.6 | 0.0 | 93.4 | 4.0 | 11.2 | <u>1.024</u> | 0.25 | 2.6 | Comparative Example |
| <u>41</u> | B | 2.6 | 1.9 | 0.0 | <u>88.0</u> | 10.1 | 11.6 | <u>1.023</u> | 0.38 | 2.5 | Comparative Example |
| 42 | B | 2.6 | 3.2 | 0.0 | 96.3 | 0.5 | 12.0 | 1.016 | 0.27 | 2.4 | Present Invention Example |
| <u>43</u> | R | 2.6 | 1.1 | <u>8.2</u> | <u>90.1</u> | 0.6 | 12.3 | 1.012 | 0.33 | 2.2 | Comparative Example |
| 44 | B | 2.6 | 3.4 | 0.0 | 93.2 | 3.4 | 11.8 | 1.019 | 0.56 | 2.2 | Present Invention Example |
| 45 | B | 2.6 | 3.8 | 0.0 | 95.3 | 0.9 | 11.6 | 1.013 | 0.41 | 2.3 | Present Invention Example |

Underlines indicate that corresponding values are outside the range of the present invention or not preferable properties.

TABLE 6A

| Manufacturing No. | Steel No. | Tensile strength TS MPa | Hole expansion rate λ % | Linearity of boundary between fractured surface and sheared surface on end surface — | Limit bend R/t — | Note |
|---|---|---|---|---|---|---|
| 1 | A | 986 | 70 | 1.040 | 2.6 | Present Invention Example |
| 2 | B | 1126 | 79 | 1.036 | 3.0 | Present Invention Example |
| <u>3</u> | B | 1017 | 68 | <u>1.055</u> | 2.7 | Comparative Example |
| <u>4</u> | B | 1031 | 64 | <u>1.062</u> | 2.6 | Comparative Example |
| <u>5</u> | B | 1012 | 62 | <u>1.048</u> | 2.8 | Comparative Example |
| <u>6</u> | B | 1037 | 58 | <u>1.053</u> | 2.6 | Comparative Example |
| <u>7</u> | B | 975 | <u>52</u> | <u>1.061</u> | 3.0 | Comparative Example |
| <u>8</u> | B | <u>979</u> | <u>51</u> | <u>1.066</u> | 2.8 | Comparative Example |
| <u>9</u> | B | 1028 | <u>61</u> | <u>1.046</u> | 2.6 | Comparative Example |
| 10 | B | 990 | 62 | <u>1.033</u> | 3.1 | Present Invention Example |
| <u>11</u> | B | <u>948</u> | <u>41</u> | 1.038 | 2.6 | Comparative Example |
| <u>12</u> | B | <u>958</u> | <u>56</u> | 1.034 | 2.7 | Comparative Example |
| <u>13</u> | B | <u>930</u> | <u>42</u> | <u>1.067</u> | 2.7 | Comparative Example |
| <u>14</u> | B | <u>972</u> | <u>58</u> | <u>1.055</u> | 2.7 | Comparative Example |
| <u>15</u> | C | 1229 | 61 | <u>1.022</u> | 3.2 | Present Invention Example |
| 16 | D | 1263 | 82 | 1.010 | 2.8 | Present Invention Example |
| 17 | E | 1057 | 57 | 1.030 | 2.7 | Present Invention Example |
| <u>18</u> | E | <u>964</u> | <u>53</u> | 1.051 | 2.6 | Comparative Example |
| <u>19</u> | F | <u>990</u> | <u>62</u> | <u>1.030</u> | 2.7 | Present Invention Example |
| 20 | G | 1082 | 69 | 1.038 | 2.8 | Present Invention Example |
| 21 | H | 983 | 71 | 1.036 | 2.5 | Present Invention Example |
| 22 | I | 1232 | 79 | 1.022 | 2.8 | Present Invention Example |
| 23 | J | 999 | 72 | 1.035 | 3.0 | Present Invention Example |

Underlines indicate that corresponding values are outside the range of the present invention or not preferable properties.

TABLE 6B

| Manufacturing No. | Steel No. | Tensile strength TS MPa | Hole expansion rate λ % | Linearity of boundary between fractured surface and sheared surface on end surface — | Limit bend R/t — | Note |
|---|---|---|---|---|---|---|
| 24 | K | 1012 | 66 | 1.040 | 2.8 | Present Invention Example |
| 25 | L | 1041 | 62 | 1.030 | 3.6 | Present Invention Example |
| 26 | M | 1037 | 67 | 1.035 | 3.0 | Present Invention Example |
| 27 | N | 983 | 63 | 1.036 | 2.6 | Present Invention Example |
| 28 | O | 1028 | 61 | 1.036 | 2.7 | Present Invention Example |
| <u>29</u> | P | <u>922</u> | 59 | <u>1.066</u> | 2.6 | Comparative Example |
| <u>30</u> | Q | <u>958</u> | <u>51</u> | 1.031 | 3.3 | Comparative Example |
| <u>31</u> | R | <u>951</u> | <u>48</u> | 1.025 | 3.8 | Comparative Example |
| <u>32</u> | S | <u>955</u> | <u>58</u> | 1.071 | 2.7 | Comparative Example |
| <u>33</u> | T | <u>985</u> | 61 | <u>1.066</u> | 2.6 | Comparative Example |
| <u>34</u> | U | 1034 | 64 | <u>1.035</u> | 2.7 | Present Invention Example |

TABLE 6B-continued

| Manufacturing No. | Steel No. | Tensile strength TS MPa | Hole expansion rate λ % | Linearity of boundary between fractured surface and sheared surface on end surface — | Limit bend R/t — | Note |
|---|---|---|---|---|---|---|
| 35 | V | 1168 | 62 | 1.010 | 2.6 | Present Invention Example |
| 36 | B | 1014 | 65 | <u>1.056</u> | 2.7 | Comparative Example |
| 37 | B | 1007 | 62 | <u>1.058</u> | 2.8 | Comparative Example |
| 38 | B | 1006 | 60 | <u>1.065</u> | 2.9 | Comparative Example |
| 39 | B | 1002 | 57 | <u>1.058</u> | 2.7 | Comparative Example |
| 40 | B | <u>960</u> | 57 | <u>1.015</u> | 2.8 | Comparative Example |
| 41 | B | <u>961</u> | 63 | 1.030 | 2.9 | Comparative Example |
| 42 | B | <u>995</u> | 69 | 1.030 | 2.8 | Present Invention Example |
| 43 | R | 990 | <u>41</u> | <u>1.051</u> | 2.7 | Comparative Example |
| 44 | B | 1070 | <u>61</u> | <u>1.044</u> | 2.8 | Present Invention Example |
| 45 | B | 992 | 68 | 1.037 | 2.7 | Present Invention Example |

Underlines indicate that corresponding values are outside the range of the present invention or not preferable properties.

As is clear from Table 6A and Table 6B, in the present invention examples, hot-rolled steel sheets having excellent strength, hole expansibility, and shearing property were obtained. Furthermore, in the present invention examples in which the average crystal grain size of the surface layer was less than 3.0 μm, hot-rolled steel sheets having the above various properties and further having excellent inside bend cracking resistance were obtained.

On the other hand, in the comparative examples in which the chemical composition and microstructure were not within the ranges specified by the present invention, any one or more of the properties (tensile strength TS, hole expansibility, and shearing property) were poor.

INDUSTRIAL APPLICABILITY

According to the above aspect of the present invention, it is possible to provide a hot-rolled steel sheet having excellent strength, hole expansibility, and shearing property. In addition, according to the preferable aspect according to the present invention, it is possible to obtain a hot-rolled steel sheet which has the above various properties and, furthermore, suppresses the occurrence of inside bend cracking, that is, has excellent inside bend cracking resistance.

The hot-rolled steel sheet according to the present invention is suitable as an industrial material used for vehicle members, mechanical structural members, and building members.

What is claimed is:

1. A hot-rolled steel sheet comprising, in terms of mass %, as a chemical composition:
C: 0.040% to 0.250%;
Si: 0.05% to 3.00%;
Mn: 1.00% to 4.00%;
sol. Al: 0.00 1% to 0.500%;
P: 0.100% or less;
S: 0.03 00% or less;
N: 0.1000% or less;
O: 0.0 100% or less;
Ti: 0% to 0.300%;
Nb: 0% to 0.3 00%;
V: 0% to 0.500%;
Cu: 0% to 2.00%;
Cr: 0% to 2.00%;
Mo: 0% to 1.00%;
Ni: 0% to 2.00%;
B: 0% to 0.0 100%;
Ca: 0% to 0.0200%;
Mg: 0% to 0.0200%;
REM: 0% to 0.1000%;
Bi: 0% to 0.020%;
one or more of Zr, Co, Zn, and W: 0% to 1.00% in total;
Sn: 0% to 0.05%; and a remainder comprising Fe and impurities, wherein, a microstructure has, in terms of area %, martensite and tempered martensite at more than 92.0% and 100.0% or less in total, residual austenite at less than 3.0%, and ferrite at less than 5.0%, an E value that indicates periodicity of the microstructure is 11.0 or more, and an I value that indicates uniformity of the microstructure is less than 1.020, a standard deviation of a Mn concentration is 0.60 mass % or less, and a tensile strength is 980 MPa or more.

2. The hot-rolled steel sheet according to claim 1, wherein an average crystal grain size of a surface layer is less than 3.0 μm.

3. The hot-rolled steel sheet according to claim 1, wherein the chemical composition comprises in terms of mass %, one or more of:
Ti: 0.005% to 0.300%;
Nb: 0.005% to 0.100%;
V: 0.005% to 0.500%;
Cu: 0.01% to 2.00%;
Cr: 0.01% to 2.00%;
Mo: 0.01% to 1.00%;
Ni: 0.02% to 2.00%;
B: 0.0001% to 0.0100%;
Ca: 0.0005% to 0.0200%;
Mg: 0.0005% to 0.0200%;
REM: 0.0005% to 0.1000%; and
Bi: 0.0005% to 0.020%.

4. The hot-rolled steel sheet according to claim 2, wherein the chemical composition comprises in terms of mass %, one or more of:

Ti: 0.005% to 0.300%;
Nb: 0.005% to 0.100%;
V: 0.005% to 0.500%;
Cu: 0.01% to 2.00%;
Cr: 0.01% to 2.00%;
Mo: 0.01% to 1.00%;
Ni: 0.02% to 2.00%;
B: 0.0001% to 0.0100%;
Ca: 0.0005% to 0.0200%;
Mg: 0.0005% to 0.0200%;
REM: 0.0005% to 0.1000%; and
Bi: 0.0005% to 0.020%.

5. A hot-rolled steel sheet consisting of, in terms of mass %, as a chemical composition:
C: 0.040% to 0.250%;
Si: 0.05% to 3.00%;
Mn: 1.00% to 4.00%;
sol. Al: 0.001% to 0.500%;
P: 0.100% or less;
S: 0.0300% or less;
N: 0.1000% or less;
O: 0.0100% or less;
Ti: 0% to 0.300%;
Nb: 0% to 0.300%;
V: 0% to 0.500%;
Cu: 0% to 2.00%;
Cr: 0% to 2.00%;
Mo: 0% to 1.00%;
Ni: 0% to 2.00%;
B: 0% to 0.0100%;
Ca: 0% to 0.0200%;
Mg: 0% to 0.0200%;
REM: 0% to 0.1000%;
Bi: 0% to 0.020%;
one or more of Zr, Co, Zn, and W: 0% to 1.00% in total;
Sn: 0% to 0.05%; and
a remainder consisting of Fe and impurities,
wherein, a microstructure has,
in terms of area %,
martensite and tempered martensite at more than 92.0% and 100.0% or less in total,
residual austenite at less than 3.0%, and
ferrite at less than 5.0%,
an E value that indicates periodicity of the microstructure is 11.0 or more, and an I value that indicates uniformity of the microstructure is less than 1.020,
a standard deviation of a Mn concentration is 0.60 mass % or less, and
a tensile strength is 980 MPa or more.

* * * * *